(12) United States Patent
Hamaoka et al.

(10) Patent No.: US 11,577,641 B2
(45) Date of Patent: *Feb. 14, 2023

(54) LIGHT PROJECTION METHOD FOR A MOVING BODY SCANNING LIGHT FROM A LIGHT SOURCE AND CONTROLLING A MIRROR PORTION

(71) Applicant: FUNAI ELECTRIC CO., LTD., Osaka (JP)

(72) Inventors: Mika Hamaoka, Osaka (JP); Shinya Shimizu, Osaka (JP); Fuminori Tanaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,453

(22) Filed: May 11, 2022

(65) Prior Publication Data

US 2022/0266744 A1    Aug. 25, 2022

Related U.S. Application Data

(63) Continuation of application No. 17/239,664, filed on Apr. 25, 2021, now Pat. No. 11,358,517.

(30) Foreign Application Priority Data

Apr. 28, 2020   (JP) .............................. JP2020-079288

(51) Int. Cl.
| | |
|---|---|
| *B60Q 1/12* | (2006.01) |
| *F21S 41/675* | (2018.01) |
| *G02B 26/10* | (2006.01) |

(52) U.S. Cl.
CPC ............ *B60Q 1/122* (2013.01); *F21S 41/675* (2018.01); *G02B 26/105* (2013.01); *B60Q 2300/112* (2013.01); *B60Q 2300/122* (2013.01)

(58) Field of Classification Search
CPC ....... F21S 41/675; G02B 26/105; G02B 6/10; G02B 6/101; G02B 6/103; G02B 6/105; G02B 6/106; G02B 6/108; B60Q 2300/112; B60Q 2300/122
See application file for complete search history.

(56) References Cited

U.S. PATENT DOCUMENTS 9,045,080 B2    6/2015   Yamamura
10,114,214 B2 * 10/2018   Yatsuda ................ F21S 41/255

FOREIGN PATENT DOCUMENTS

CN              103492228           1/2014

* cited by examiner

*Primary Examiner* — Robert J May
(74) *Attorney, Agent, or Firm* — JCIPRNET

(57) ABSTRACT

A light projection method for a moving body which is performed by a processor of the moving body is provided. The method comprises: irradiating light from a light source of the moving body; scanning the light irradiated from the light source with an angle range that is formed by swing a mirror portion of an optical scanner of the moving body; acquiring change information of the angle range at which the mirror portion swings; changing the angle range at which the mirror portion swings based on the acquired change information; and changing an irradiation range of the light irradiated from the light source.

10 Claims, 19 Drawing Sheets

LIGHT PROJECTION METHOD FOR A MOVING BODY SCANNING LIGHT FROM A LIGHT SOURCE AND CONTROLLING A MIRROR PORTION

CROSS REFERENCE TO RELATED APPLICATIONS

The present application is a continuation of U.S. Ser. No. 17/239,664, filed on Apr. 25, 2021, and is related to and claims the priority benefit of Japan application serial no. 2020-079288, filed on Apr. 28, 2020. The entirety of the above-mentioned patent application is hereby incorporated by reference herein and made a part of this specification.

BACKGROUND

Technical Field

The disclosure relates to a light projection device for moving body, and particularly to a light projection device for moving body that scans light by an optical scanner.

Related Art

Conventionally, a light projection device for moving body that scans light by an optical scanner is known (for example, see Patent literature 1, Japanese Patent Application Laid-Open No. 2019-91652).

Patent literature 1 discloses a light irradiation device including a light source, an optical deflector, a control portion, and a projected light generation portion.

The optical deflector disclosed in Patent literature 1 has a mirror portion that rotates forward/reversely around an axis line, and the optical deflector emits incident light as scanning light that is reflected and deflected by the mirror portion. In addition, the control portion controls an irradiation range and an irradiation intensity of the scanning light by controlling a rotation cycle or a rotation angle range of the forward/reverse rotation of the mirror portion around the axis line. In addition, the projected light generation portion is configured to condense the light reflected by the mirror portion at a predetermined position.

In the configuration disclosed in Patent literature 1, a spot diameter of the scanning light, a width of the scanning light, and a condensing point distance of the projected light generation portion on a virtual screen are set in a manner to match a width in a scanning direction of the scanning light scanned by the mirror portion with a size and a shape of an irradiation region. That is, in the configuration disclosed in Patent literature 1, the spot diameter of the scanning light, the width of the scanning light, and the condensing point distance of the projected light generation portion are set, and thereby an irradiation range of the irradiated light is preset.

Here, in the configuration disclosed in Patent literature 1, the irradiation range of the light is preset. However, the light irradiation device (the light projection device for moving body) as disclosed in Patent literature 1 is desired to change the irradiation range of the light according to a movement status of the moving body and an operation of an operator and widen or narrow the irradiation range of the irradiated light.

SUMMARY

The disclosure provides a light projection method for a moving body capable of widening or narrowing an irradiation range of irradiated light even when the light irradiated from a light source is scanned by a mirror portion.

According to one embodiment of the disclosure, a light projection method for a moving body which is performed by a processor of the moving body is provided. The method comprises: irradiating light from a light source of the moving body; scanning the light irradiated from the light source with an angle range that is formed by swing a mirror portion of an optical scanner of the moving body; acquiring change information of the angle range at which the mirror portion swings; changing the angle range at which the mirror portion swings based on the acquired change information; and changing an irradiation range of the light irradiated from the light source.

DESCRIPTION OF THE EMBODIMENTS

Embodiments of the disclosure are described below with reference to the drawings.

A configuration of a light projection device for moving body 100 according to an embodiment is described with reference to FIGS. 1 to 13.

(Moving Body)

Figure 1:
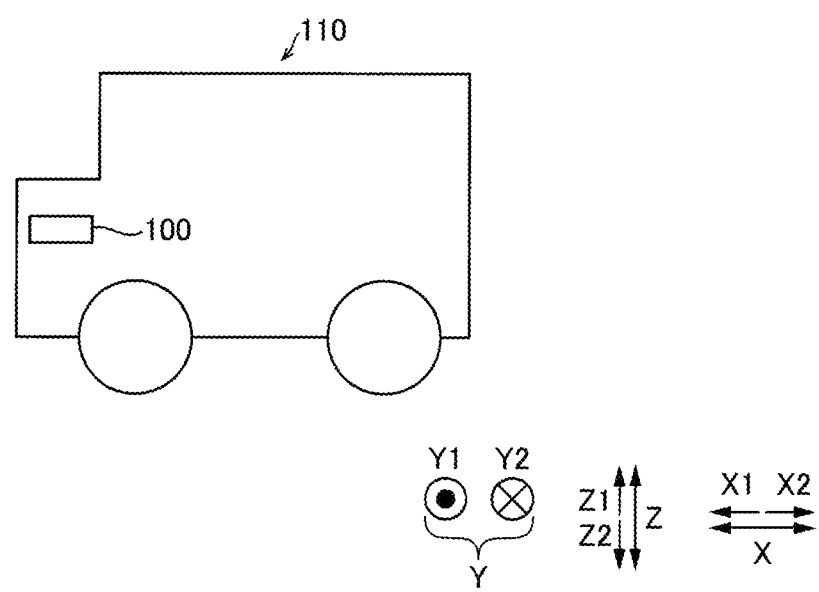
FIG. 1 is a schematic diagram for illustrating a moving body on which a light projection device for moving body according to an embodiment is mounted.

As shown in FIG. 1, the light projection device for moving body 100 according to the embodiment is mounted on a moving body 110. In addition, the light projection device for moving body 100 is configured to irradiate light to the front of the moving body 110. That is, the light projection device for moving body 100 is a headlight (head lamp). The moving body 110 is, for example, an automobile. Moreover, in the specification, in addition, a vertical direction is defined as a Z-direction, an upper direction is defined as a Z1-direction, and a lower direction is defined as a Z2-direction. In addition, two directions orthogonal to each other in a plane orthogonal to the Z-direction are respectively defined as an X-direction and a Y-direction. One side of the X-direction is defined as an X1-direction and the other side of the X-direction is defined as an X2-direction. One side of the Y-direction is defined as a Y1-direction and the other side of the Y-direction is defined as a Y2-direction. In the example shown in FIG. 1, the front of the moving body 110 is in the X1-direction.

(Configuration of Light Projection Device for Moving Body)

Figure 2:
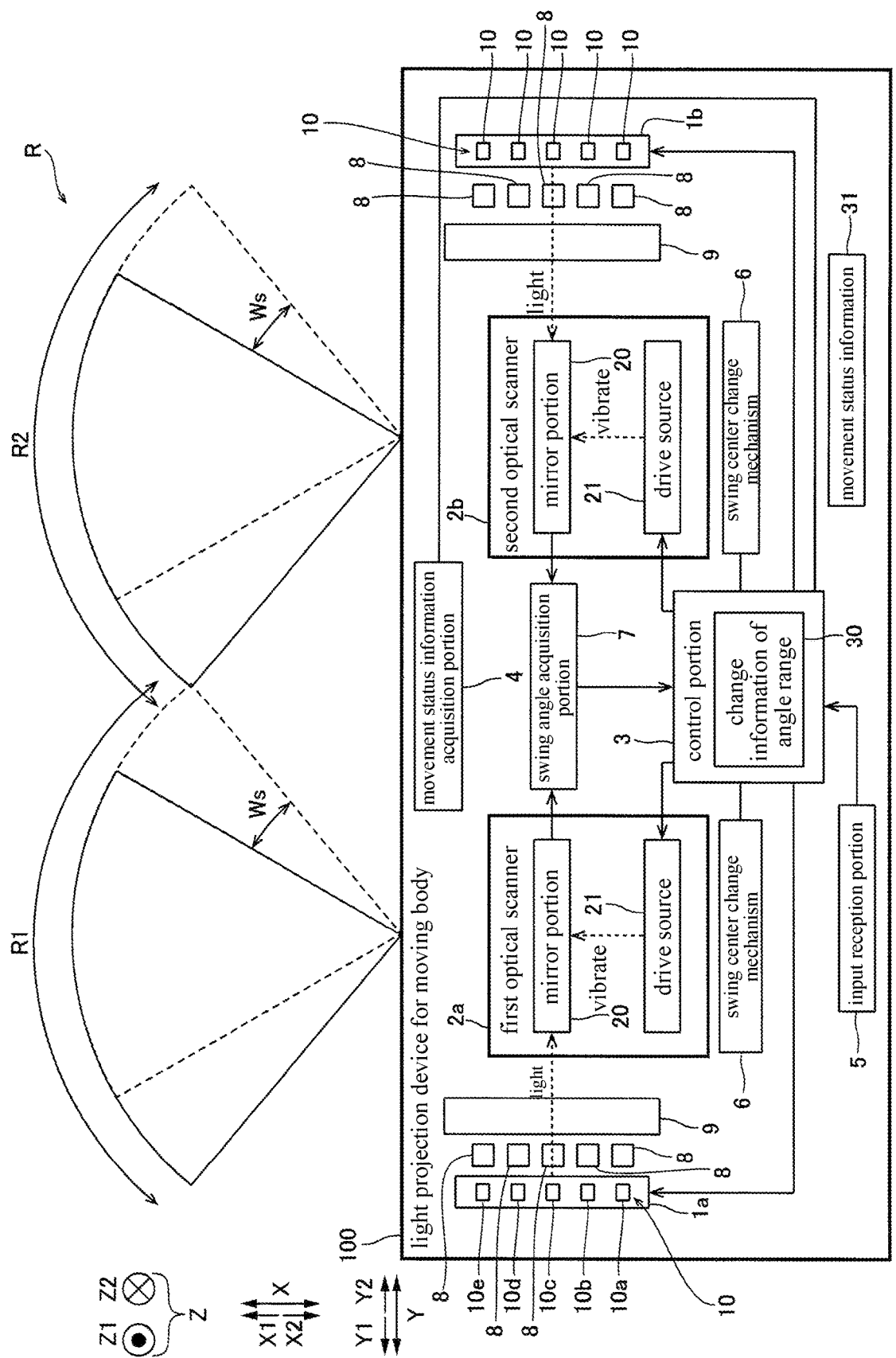
FIG. 2 is a block diagram showing an overall configuration of the light projection device for moving body according to an embodiment.

As shown in FIG. 2, the light projection device for moving body 100 according to the embodiment includes a light source, an optical scanner, a control portion 3, a movement status information acquisition portion 4, an input reception portion 5, and a scanning center change mechanism 6, a swing angle acquisition portion 7, a first lens 8, and a second lens 9. The light projection device for moving body 100 is configured to irradiate light in the traveling direction of the moving body 110 (the X1-direction).

The light source is configured to output light. The light source includes a first light source 1a and a second light source 1b. Specifically, the first light source 1a has a plurality of light emission portions 10. In the embodiment, the first light source 1a has, as the plurality of light emission portions 10, a first light emission portion 10a, a second light emission portion 10b, a third light emission portion 10c, a fourth light emission portion 10d, and a fifth light emission portion 10e. In addition, the second light source 1b has a plurality of light emission portions 10. Similar to the first light source 1a, the second light source 1b also includes five light emission portions 10. The light irradiated from the plurality of light emission portions 10 is irradiated to a mirror portion 20 included in the optical scanner via the first lens 8 and the second lens 9. The light source includes, for example, a light emitting diode (LED), a laser diode (LD), or the like. In the embodiment, the light source is a LED.

The first lens 8 is irradiated with light from the light source. In the embodiment, a plurality of the first lenses 8 are arranged. Specifically, one first lens 8 is arranged for each of the plurality of light emission portions 10. That is, five first lenses 8 are arranged at positions between the first light source 1a and the second lens 9. In addition, five first lenses 8 are arranged at positions between the second light source 1b and the second lens 9. The first lens 8 is configured to condense the light irradiated from the light source on the second lens 9.

The second lens 9 is arranged between the first lens 8 and the optical scanner. The second lens 9 is configured to condense the light that has passed through the first lens 8 on the optical scanner. In the embodiment, the second lens 9 is respectively arranged at a position between the first lens 8 and a first optical scanner 2a and a position between the first lens 8 and a second optical scanner 2b.

The optical scanner includes the first optical scanner 2a and the second optical scanner 2b. The first optical scanner 2a is a headlight arranged on a left side of the moving body 110 (the Y1-direction side). In addition, the second optical scanner 2b is a headlight arranged on a right side of the moving body 110 (the Y2-direction side). The first optical scanner 2a includes a mirror portion 20 and a drive source 21. In addition, the second optical scanner 2b includes a mirror portion 20 and a drive source 21. In the embodiment, the first optical scanner 2a and the second optical scanner 2b have the same configuration as each other, and thus, in the following description, the first optical scanner 2a is mainly described.

The first optical scanner 2a swings the mirror portion 20 by a plate wave generated by the drive source 21 and scans the light irradiated from the plurality of light emission portions 10. The first optical scanner 2a irradiates the light irradiated from the plurality of light emission portions 10 into a first irradiation range R1. In addition, the second optical scanner 2b irradiates the light irradiated from the plurality of light emission portions 10 into a second irradiation range R2. Detailed configurations of the first optical scanner 2a and the second optical scanner 2b are described later.

The mirror portion 20 is configured to scan the light that has passed through the first lens 8 and the second lens 9.

The drive source 21 is configured to swing the mirror portion 20. The drive source 21 includes, for example, a piezoelectric element. The piezoelectric element includes, for example, lead zirconate titanate (PZT). Details of the configuration in which the drive source 21 swings the mirror portion 20 are described later.

The control portion 3 is configured to control each portion of the light projection device for moving body 100. In addition, the control portion 3 is configured to control the irradiation of the light from the light source. Specifically, the control portion 3 controls the irradiation of the light from the light source and stop of the irradiation. Moreover, when the light is irradiated from the light source, the control portion 3 controls the light amount to be constant. In addition, the control portion 3 is configured to control the first optical scanner 2a and the second optical scanner 2b. In addition, the control portion 3 is configured to control the scanning center change mechanism.

The control portion 3 controls to acquire change information 30 of an angle range Ws at which the mirror portion 20 swings, change the angle range Ws at which the mirror portion 20 swings by controlling the drive source 21 based on the acquired change information 30, and change an irradiation range R of the light irradiated from the light source. Moreover, the irradiation range R of the light is an irradiation range formed by the first irradiation range R1 of the light irradiated from the first optical scanner 2a and the second irradiation range R2 of the light irradiated from the second optical scanner 2b.

In addition, the control portion 3 forms a region R3 (see FIG. 13) irradiated with light and a region R4 (see FIG. 13) not irradiated with light. The control portion 3 includes, for example, a processor such as a central processing portion (CPU) or the like. Details of the configuration in which the control portion 3 forms the region R3 irradiated with light and the region R4 not irradiated with light are described later.

The movement status information acquisition portion 4 is configured to acquire movement status information 31. The movement status information acquisition portion 4 acquires, as the movement status information 31, at least one of a movement speed of the moving body 110, a movement direction of the moving body 110, and a surrounding status of a position where the moving body 110 is moving. In the embodiment, the movement status information acquisition portion 4 acquires, as the movement status information 31, all of the movement speed of the moving body 110, the movement direction of the moving body 110, and the surrounding status of the position where the moving body 110 is moving.

The movement status information acquisition portion 4 acquires the movement status information 31 from an engine control portion (ECU) (not shown) included in the moving body 110. The movement speed of the moving body 110 is stored in the ECU. In addition, information of a steering operation status of the moving body 110 is stored in the ECU. In addition, the ECU stores the surrounding status of the position where the moving body 110 is moving, which is acquired by map information obtained by a car navigation system, an imaging camera, an ultrasonic sensor, or the like.

The input reception portion 5 is configured to receive an operation input of an operator. The input reception portion 5 is configured to output the operation input of the operator to the control portion 3. The input reception portion 5 includes, for example, a controller operated by the operator. The controller includes, for example, a joystick or the like. Moreover, the input reception portion 5 does not include a handle, an accelerator, and a brake arranged on the moving body 110.

The scanning center change mechanism is configured to change a center of a scanning range of the scanning light scanned by the mirror portion 20. In the embodiment, the scanning center change mechanism includes a swing center change mechanism 6.

The swing center change mechanism 6 is configured to change a swing center Sc (see FIG. 10) when the mirror portion 20 swings. The swing center change mechanism 6 includes, for example, an arrangement portion 6a (see FIG. 10) for arranging the optical scanner and a rotation portion 6b (see FIG. 10) for rotating the arrangement portion 6a. Details of the configuration in which the swing center change mechanism 6 changes the swing center Sc of the mirror portion 20 are described later.

The swing angle acquisition portion 7 is configured to acquire a swing angle of the mirror portion 20. The swing angle acquisition portion 7 includes, for example, a magnetic angle sensor.

(Configuration of Optical Scanner)

Figure 3:
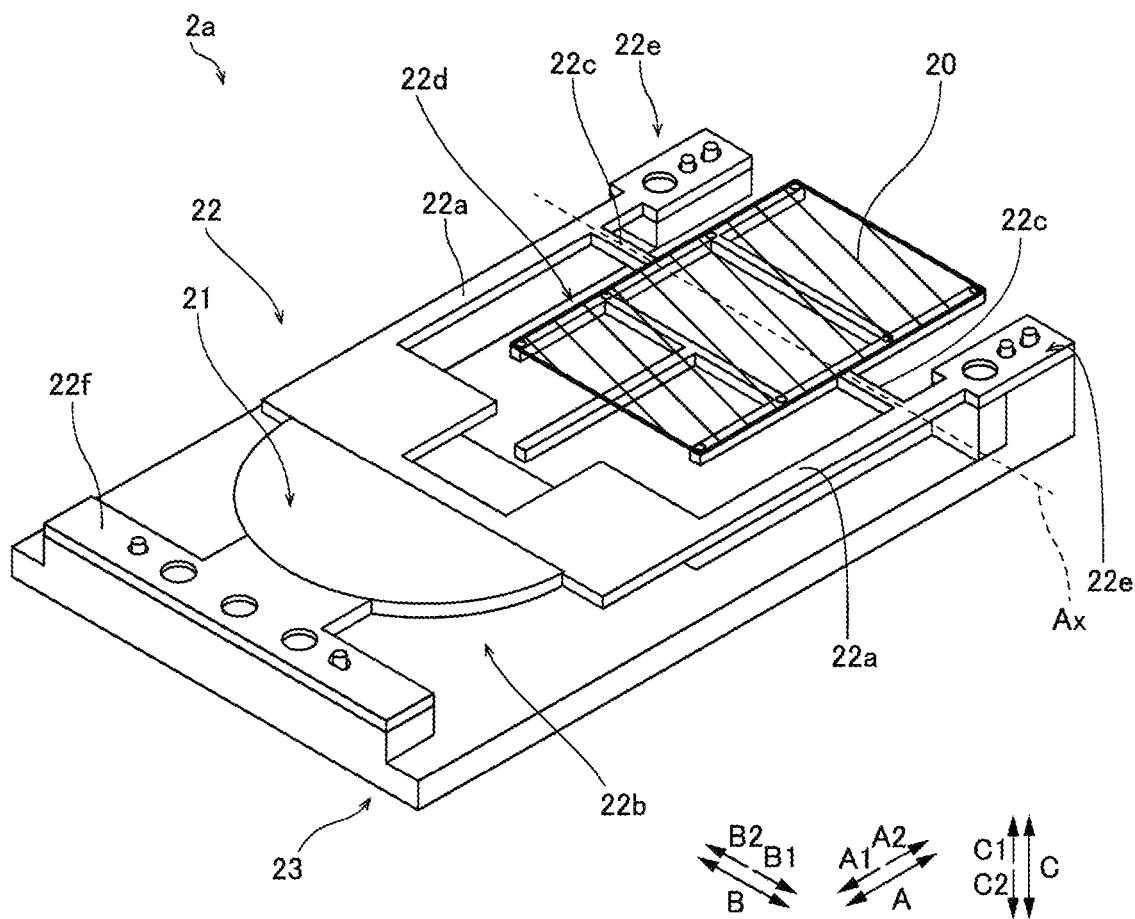
FIG. 3 is a perspective view for illustrating a configuration of an optical scanner according to an embodiment.

As shown in FIG. 3, the first optical scanner 2a includes the mirror portion 20, the drive source 21, a substrate 22, and a holding member 23. Moreover, in the example shown in FIG. 3, a direction orthogonal to a swing axis Ax of the substrate 22 is defined as an A-direction, one side of the A-direction is defined as an A1-direction, and the other side of the A-direction is defined as an A2-direction. In addition, a direction in which the swing axis Ax extends is defined as a B-direction, one side of the B-direction is defined as a B1-direction, and the other side of the B-direction is defined as a B2-direction. In addition, a direction orthogonal to an AB-plane is defined as a C-direction, one side of the C-direction is defined as a C1-direction, and the other side of the C-direction is defined as a C2-direction.

The mirror portion 20 is configured to reflect the light irradiated from the light source. The mirror portion 20 is made of a metal member having a flat plate shape. The mirror portion 20 is made of, for example, an aluminum material. In the embodiment, the mirror portion 20 is arranged separately from the substrate 22. Specifically, the mirror portion 20 is arranged in a mirror portion arrangement portion 22d. Moreover, in the example shown in FIG. 2, the mirror portion 20 is shown with hatching for convenience.

The substrate 22 includes a pair of beam portions 22a, a support portion 22b, and a torsion portion 22c. In addition, the substrate 22 includes the mirror portion arrangement portion 22d in which the mirror portion 20 is arranged. The substrate 22 is made of, for example, a stainless steel material having a flat plate shape.

Each of the pair of beam portions 22a is supported by the support portion 22b on the A1-direction side. In addition, in the example shown in FIG. 3, a held portion 30e is formed by increasing an X-direction width of ends of the pair of beam portions 22a on the Y2-direction side. In addition, the held portion 30e is held by the holding member 23 by, for example, being screwed.

The support portion 22b is configured to support an end of each of the pair of beam portions 22a on the A1-direction side. In addition, the drive source 21 is arranged in the support portion 22b. In addition, the support portion 22b has a held portion 22f at an end on a side not supporting the pair of beam portions 22a in the A1-direction. The support portion 22b is held by the holding member 23 by, for example, being screwed.

The torsion portion 22c supports the mirror portion 20 so as to be swingable around the swing axis Ax. The torsion portion 22c extends in the direction (the B-direction) orthogonal to the direction (the A-direction) in which the pair of beam portions 22a extend in a direction along a surface of the mirror portion 20. In addition, the torsion portion 22c has a columnar shape. In addition, a pair of the torsion portions 22c are arranged. One of the pair of torsion portions 22c is connected to one of the pair of beam portions 22a, and the other torsion portion 22c is connected to the other beam portion 22a. In addition, each of the pair of torsion portions 22c is connected to the mirror portion arrangement portion 22d.

The mirror portion arrangement portion 22d is configured in a manner that the mirror portion 20 is arranged. In addition, the mirror portion arrangement portion 22d is connected to the pair of beam portions 22a via the torsion portions 22c. A detailed configuration of the mirror portion arrangement portion 22d is described later.

The drive source 21 is configured to generate a plate wave for swinging the mirror portion 20. The plate wave is vibration in an XY-plane direction caused by expansion and contraction of the drive source 21 in the C-direction. The drive source 21 swings the mirror portion 20 by the generated plate wave in a manner that the mirror portion 20 reciprocates and vibrates around an axis line of the predetermined swing axis Ax. That is, the first optical scanner 2a is a resonance drive type optical scanner.

The holding member 23 is configured to hold the support portion 22b. As shown in FIG. 3, the holding member 23 holds the held portion 22f. In addition, the holding member 23 is configured to hold each of the pair of beam portions 22a. As shown in FIG. 2, the holding member 23 is configured to hold the held portion 30e of the pair of beam portions 22a.

As shown in FIG. 3, the substrate 22 has, for example, a U-shape. In addition, although not shown in FIG. 3, the holding member 23 also has, for example, a U-shape in the same manner as the substrate 22.

(Light Scanning Performed by Optical Scanner)

Figure 4:
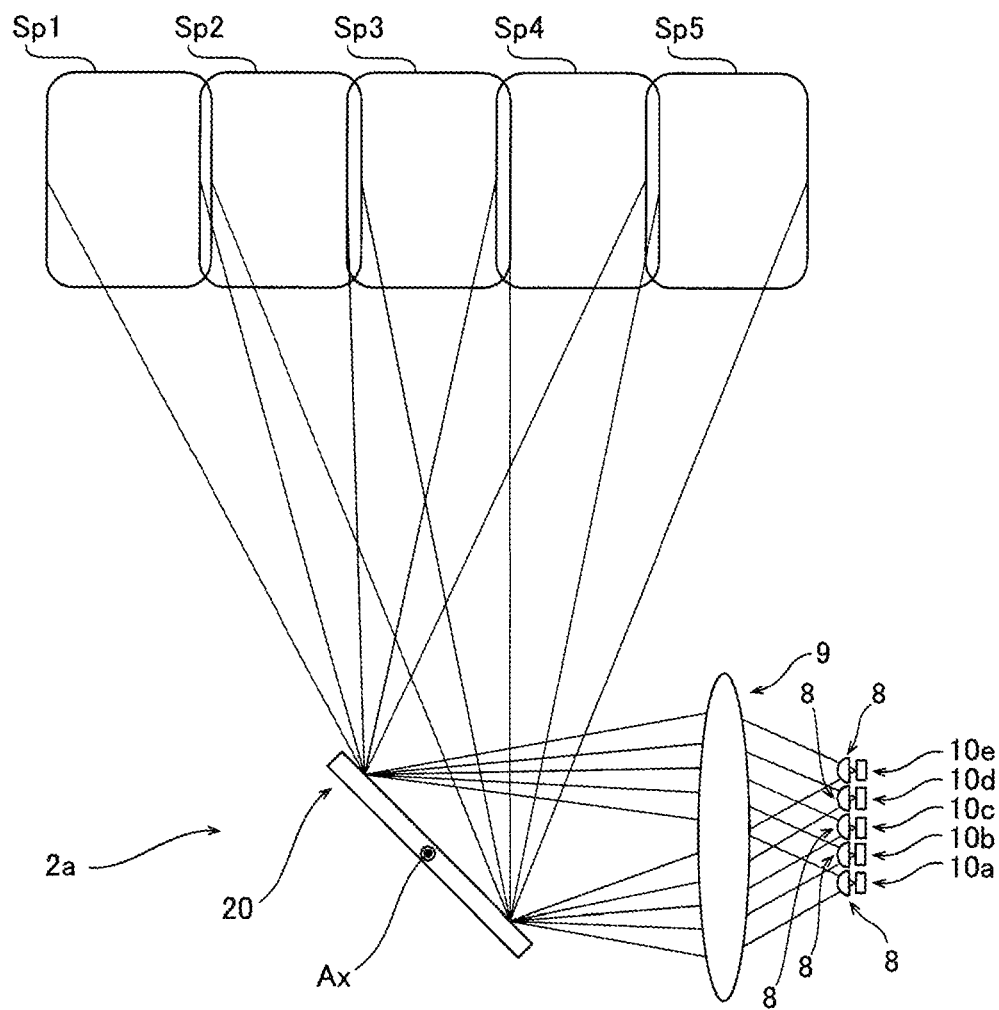
FIG. 4 is a schematic diagram for illustrating spot light irradiated from a plurality of light emission portions when a mirror portion of the optical scanner according to an embodiment is stopped.
Figure 5:
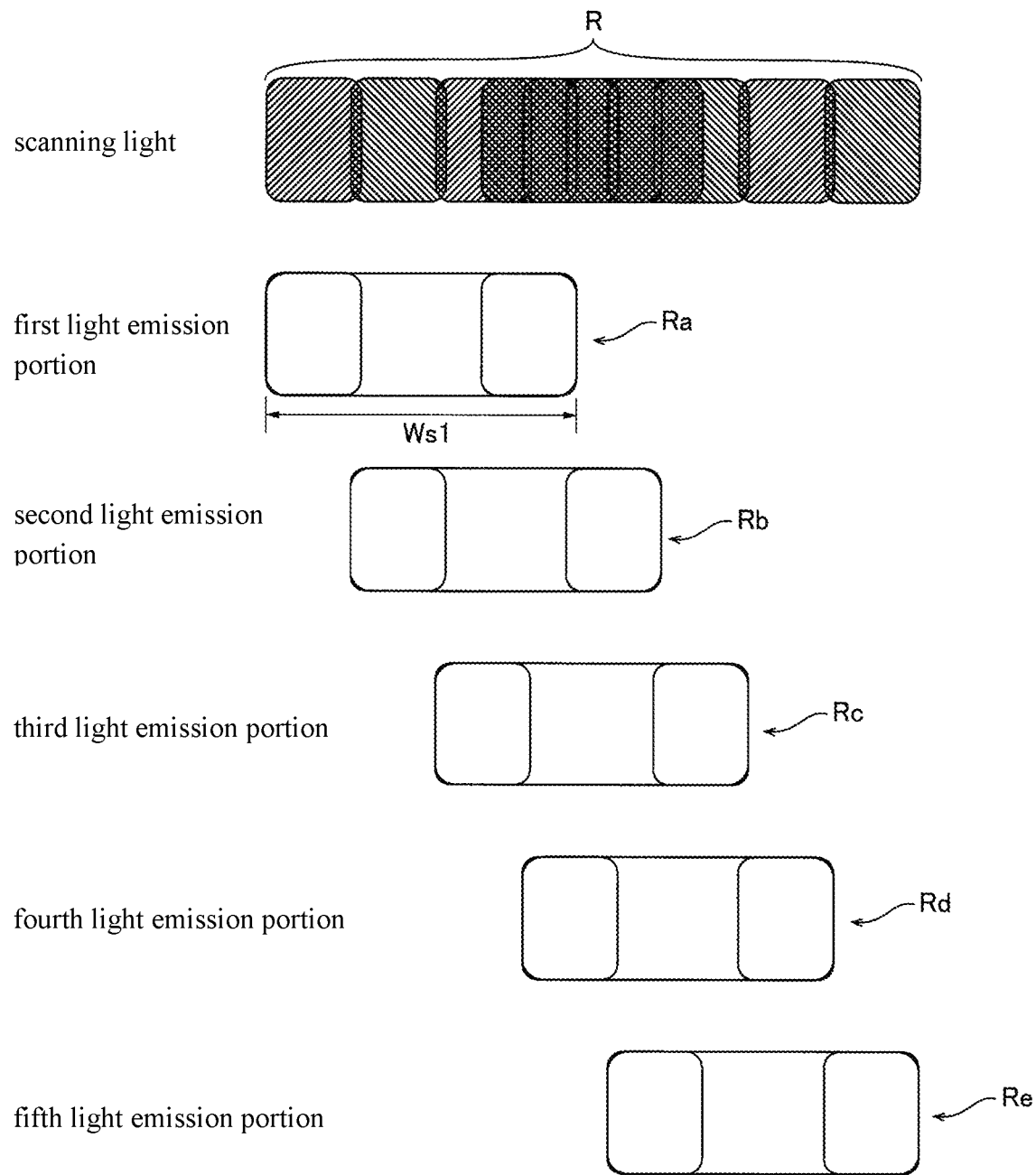
FIG. 5 is a schematic diagram for illustrating an irradiation range of scanning light irradiated from each light emission portion when a swing angle range of the mirror portion according to an embodiment is large.
Figure 6:
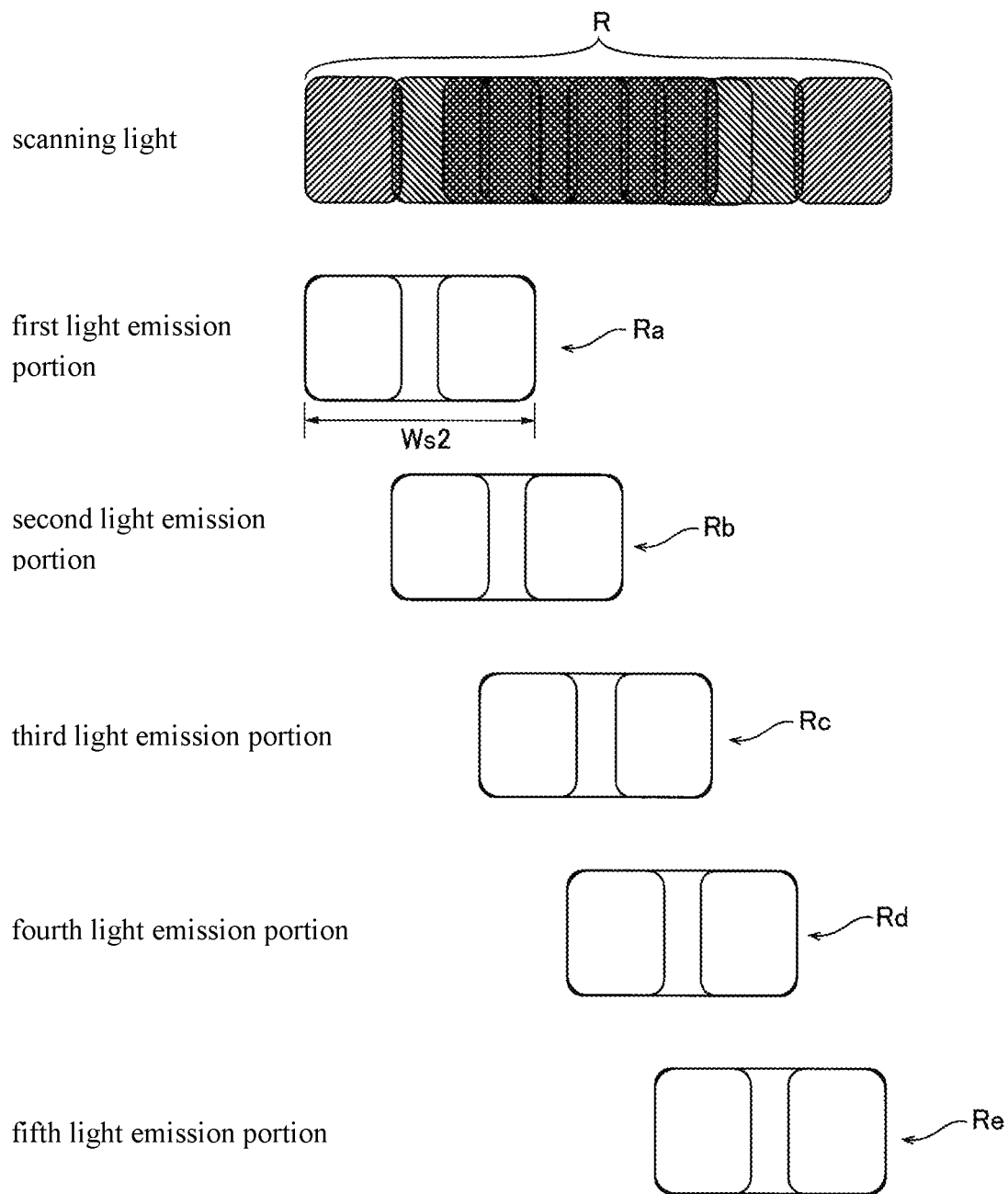
FIG. 6 is a schematic diagram for illustrating the irradiation range of the scanning light irradiated from each light emission portion when the swing angle range of the mirror portion according to an embodiment is small.

Next, with reference to FIGS. 4 to 6, a configuration in which the first optical scanner 2a according to the embodiment scans the light irradiated from the plurality of light emission portions 10 is described.

In the example shown in FIG. 4, spot light is shown which is formed in a manner that the light irradiated from the plurality of light emission portions 10 and transmitted through the first lens 8 and the second lens 9 is reflected by the mirror portion 20 of the first optical scanner 2a.

Specifically, light irradiated from the first light emission portion 10a and reflected by the mirror portion 20 is irradiated as first spot light Sp1. In addition, light irradiated from the second light emission portion 10b and reflected by the mirror portion 20 is irradiated as second spot light Sp2. In addition, light irradiated from the third light emission portion 10c and reflected by the mirror portion 20 is irradiated as third spot light Sp3. In addition, light irradiated from the fourth light emission portion 10d and reflected by the mirror portion 20 is irradiated as fourth spot light Sp4. In addition, light irradiated from the fifth light emission portion 10e and reflected by the mirror portion 20 is irradiated as fifth spot light Sp5.

Moreover, each beam of spot light is arranged at predetermined intervals according to an arrangement interval of each light emission portion 10. In the example shown in FIG. 4, because the arrangement interval of each light emission portion 10 is close, adjacent beams of spot light overlap each other.

(Difference in Irradiation Region Due to Swing Angle Range)

Next, a difference in the irradiation range R (see FIG. 5) due to a difference in the swing angle range Ws (see FIG. 2) is described with reference to FIGS. 5 and 6.

FIG. 5 shows an example in which the mirror portion 20 swings to form a swing angle range Ws1 and the spot light irradiated from each light emission portion 10 is scanned. The first spot light Sp1 irradiated from the first light emission portion 10a illuminates an irradiation range Ra as scanning light by being scanned in the swing angle range Ws1. Similarly, each spot light irradiated from the second light emission portion 10b to the fifth light emission portion 10e also illuminates irradiation ranges Rb to Re as scanning light by being scanned in the swing angle range Ws1.

The light irradiated from the first optical scanner 2a is irradiated in a state in which the light irradiated from each light emission portion 10 overlaps. Therefore, the scanning light irradiated from the first optical scanner 2a illuminates the irradiation range R. In addition, as the irradiation range R of the scanning light overlaps, an intensity of the irradiated light increases. Moreover, the irradiation range R of the scanning light is shown with hatching in a manner to make the overlap of the regions of the scanning light irradiated from each light emission portion 10 easier to visually recognize. In addition, a portion where the hatching is darkened is a portion where more regions of the scanning light overlap.

FIG. 6 shows an example in which the mirror portion 20 swings to form a scanning width of a swing angle range Ws2, and the spot light irradiated from each light emission portion 10 is scanned. Moreover, the swing angle range Ws2 is a value smaller than that of the swing angle range Ws1 shown in FIG. 5. When the spot light irradiated from each light emission portion 10 is scanned in the swing angle range Ws2, the scanning light irradiated from the first optical scanner 2a illuminates the irradiation range R. Moreover, as well in FIG. 6, the irradiation range R of the scanning light is shown with hatching in a manner to make the overlap of the regions of the scanning light irradiated from each light emission portion 10 easier to visually recognize. In addition, a portion where the hatching is darkened is a portion where more regions of the scanning light overlap.

Figure 7:
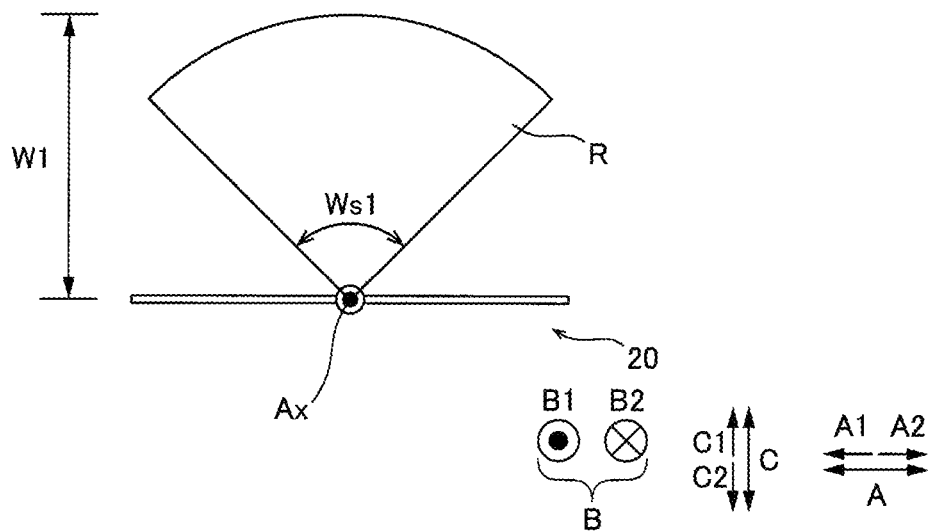
FIG. 7 is a schematic diagram for illustrating the swing angle range of the mirror portion when the swing angle range of the mirror portion according to an embodiment is large.

FIG. 7 shows an irradiation range R to which the scanning light is irradiated when the mirror portion 20 swings in the swing angle range Ws1. As shown in FIG. 7, when the mirror portion 20 swings in the swing angle range Ws1, the light reaches a distance W1 in the C-direction.

Figure 8:
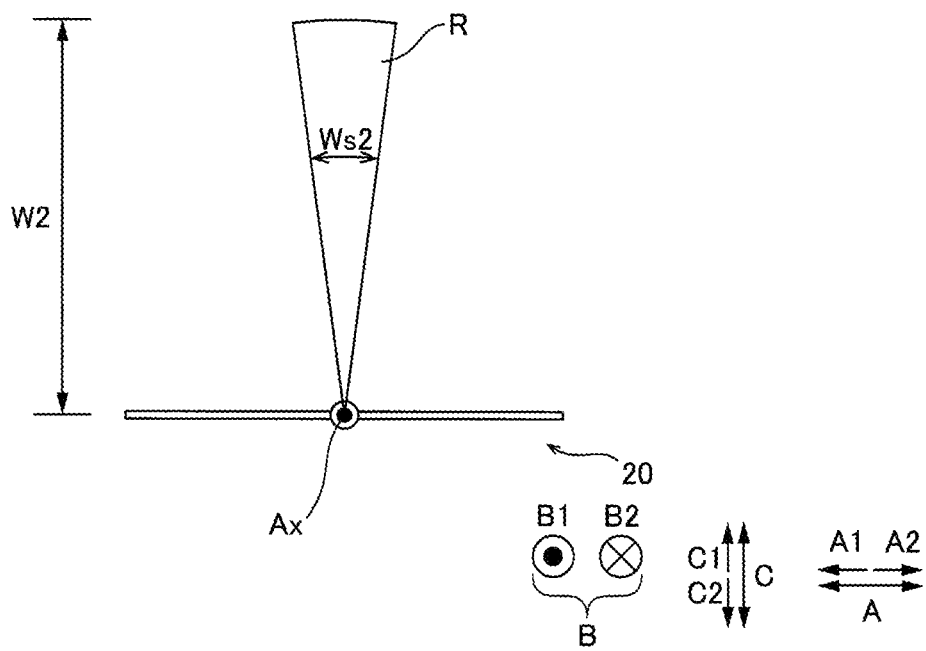
FIG. 8 is a schematic diagram for illustrating the swing angle range of the mirror portion when the swing angle range of the mirror portion according to an embodiment is small.

FIG. 8 shows an irradiation range R to which the scanning light is irradiated when the mirror portion 20 swings in the swing angle range Ws2. As shown in FIG. 8, when the mirror portion 20 swings in the swing angle range Ws2, the light reaches a distance W2 in the C-direction. Moreover, the swing angle range Ws2 is a smaller angle range than the swing angle range Ws1.

Because the swing angle range Ws2 is smaller than the swing angle range Ws1, the irradiation range R shown in FIG. 8 is narrower than the irradiation range R shown in FIG. 7. In addition, in the embodiment, the light amount of the light irradiated from each light emission portion 10 is constant. When the light amount of the light irradiated from the light emission portion 10 is constant, the narrower the irradiation range R, the higher the light intensity. Therefore, when the mirror portion 20 swings in the swing angle range Ws2, the light intensity is higher than that when the mirror portion 20 swings in the swing angle range Ws1, and thus the distance W2 that the light reaches is greater than the distance W1.

In the embodiment, the control portion 3 acquires the change information 30 of the angle range Ws (see FIG. 2) based on the movement status information 31 (see FIG. 2) acquired by the movement status information acquisition portion 4 (see FIG. 2). Specifically, the control portion 3 acquires the change information 30 of the angle range Ws based on at least one of the movement speed of the moving body 110, the movement direction of the moving body 110, and the surrounding status of the position where the moving body 110 is moving.

(Change of Irradiation Range of Light Based on Speed of Moving Body)

Figure 9:
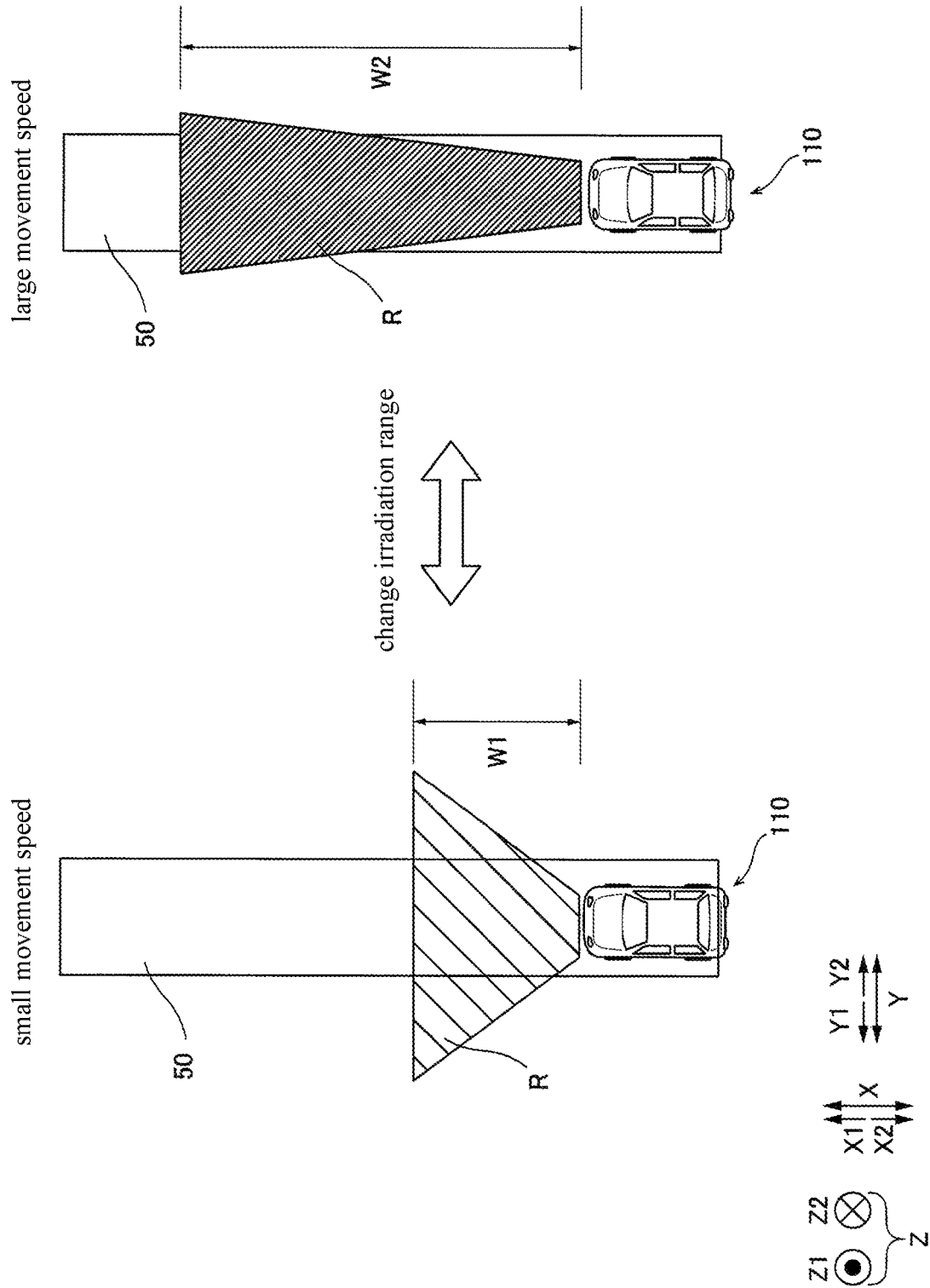
FIG. 9 is a schematic diagram for illustrating a configuration in which a control portion according to an embodiment changes the irradiation range of the scanning light based on a movement speed of the moving body.

First, with reference to FIG. 9, a configuration is described in which the control portion 3 changes the irradiation range R based on the movement speed of the moving body 110.

When the movement status information 31 is the movement speed of the moving body 110, the control portion 3 acquires the change information 30 of the angle range Ws based on the change in the movement speed of the moving body 110. The control portion 3 controls to change the swing center Sc of the mirror portion 20 based on the acquired change information 30 of the angle range Ws.

Specifically, the control portion 3 controls to reduce the swing angle range Ws of the mirror portion 20s as the movement speed of the moving body 110 increases. That is, the control portion 3 controls the first optical scanner 2a in a manner that the irradiation range R of the scanning light becomes narrower as the movement speed of the moving body 110 increases.

In addition, the control portion 3 controls to increase the swing angle range Ws of the mirror portion 20 as the movement speed of the moving body 110 decreases. That is, the control portion 3 controls the first optical scanner 2a in a manner that the irradiation range R of the scanning light becomes wider as the movement speed of the moving body 110 decreases.

(Change of Swing Center)

Figure 10:
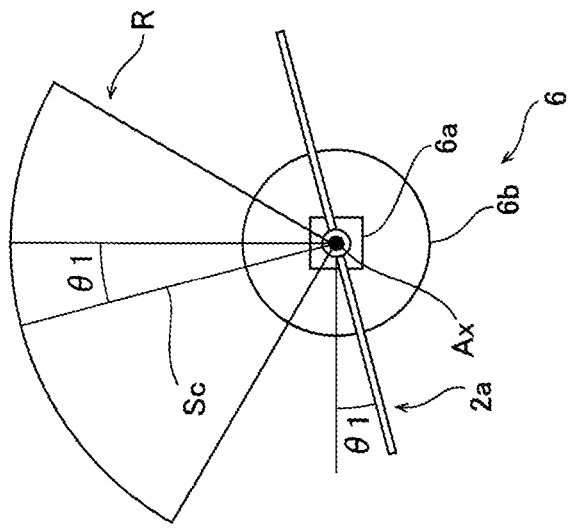
FIG. 10 is a schematic diagram for illustrating a configuration for changing a swing center by a swing center change mechanism according to an embodiment.
Figure 10:
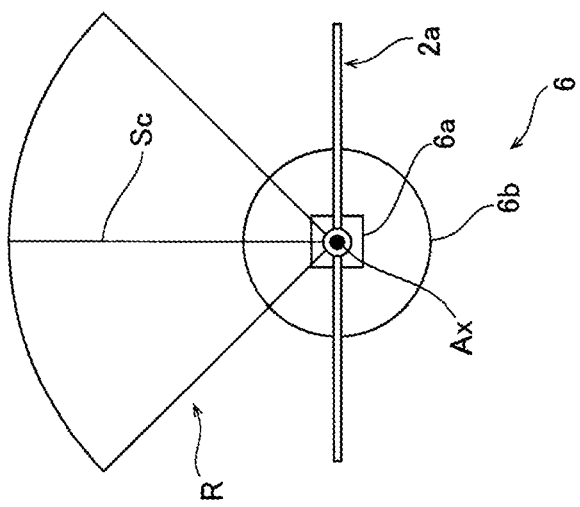
Figure 10:
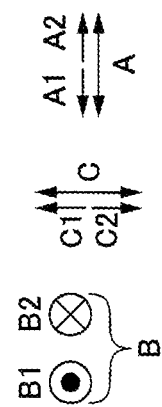

As shown in FIG. 10, the control portion 3 controls the swing center change mechanism 6 to change the swing center Sc of the mirror portion 20. In the embodiment, the control portion 3 controls to change the swing center Sc of the mirror portion 20 based on the change information 30 (see FIG. 2) of the angle range Ws, thereby controlling the irradiation position of the light irradiated from the light source. Moreover, the swing center Sc is a center of the angle range Ws (see FIG. 2) when the mirror portion 20 swings.

In the example shown in FIG. 10, the control portion 3 rotates the first optical scanner 2a by an angle θ1 based on the change information 30 (see FIG. 2) of the angle range Ws, thereby changing the swing center Sc by the angle θ1.

(Change of Irradiation Position of Light Based on Movement Direction of Moving Body)

Figure 11:
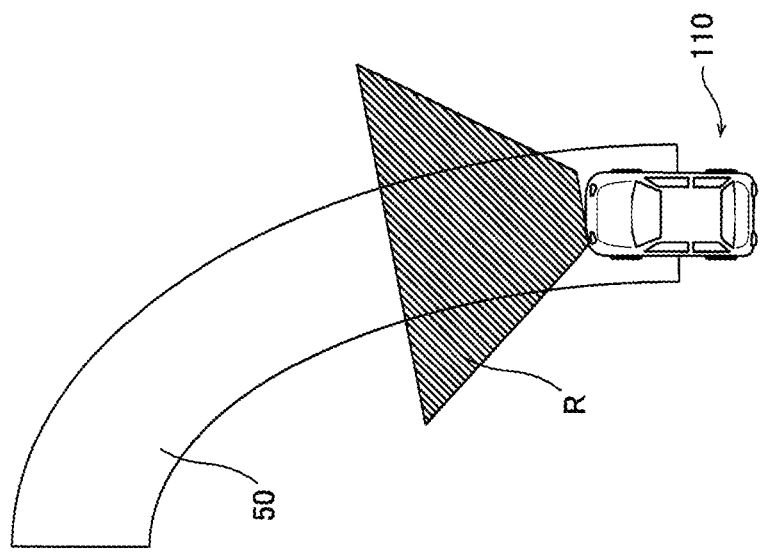
FIG. 11 is a schematic diagram for illustrating a configuration in which the control portion according to an embodiment changes an irradiation position of the scanning light based on a movement direction of the moving body.
Figure 11:
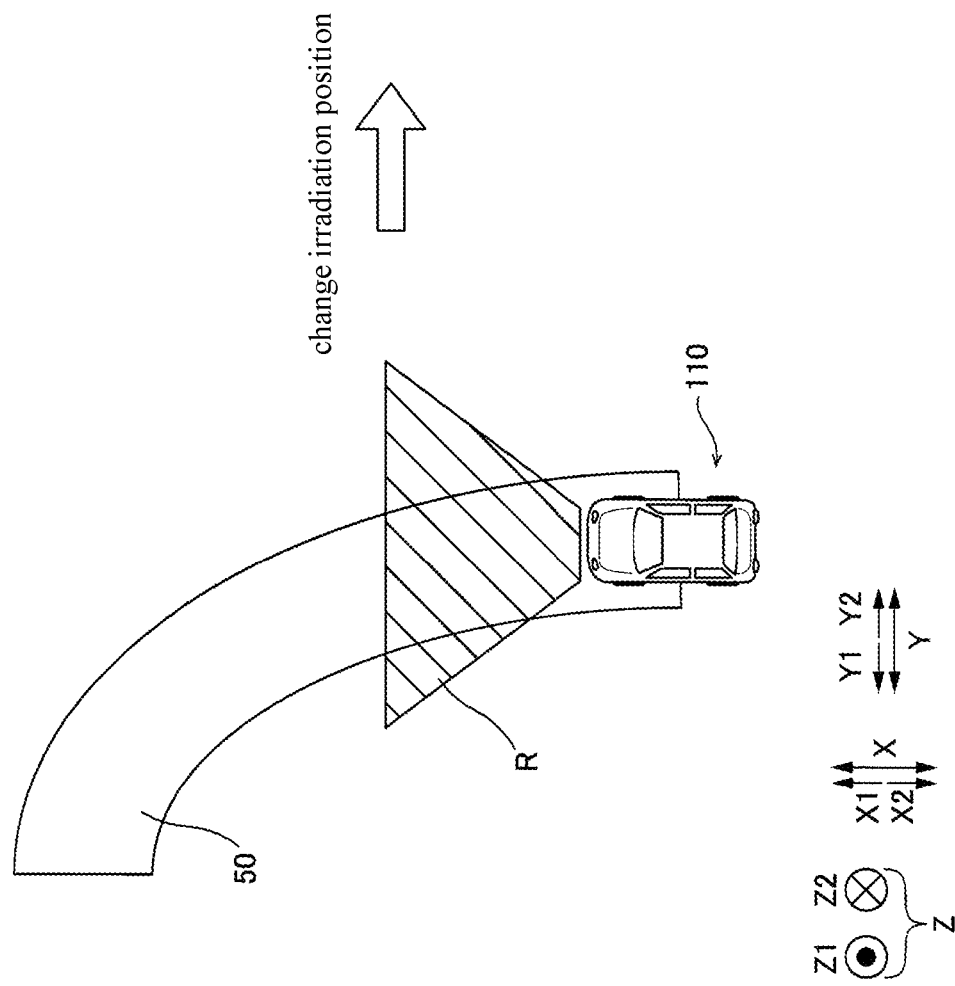

In the example shown in FIG. 11, a case is assumed that the moving body 110 moves on a road 50 in which the traveling direction of the moving body 110 is curved to the left. In this case, the operator turns a steering wheel of the moving body 110 to the left. The movement status information acquisition portion 4 (see FIG. 2) acquires the operation in which the operator turns the steering to the left, and outputs the operation in which the steering is turned to the left as the movement status information 31 (see FIG. 2). The control portion 3 acquires the change information 30 (see FIG. 2) of the angle range Ws based on the movement status information 31 output from the movement status information acquisition portion 4. In addition, the control portion 3 controls the swing center change mechanism 6 based on the acquired change information 30 of the angle range Ws, and controls to change the irradiation position of the light to the left. Moreover, the irradiation position of the light is a direction in which the center of the irradiation range R of the light faces. That is, changing the irradiation position of the light means changing the direction in which the center of the irradiation range R of the light faces. In addition, the movement status information acquisition portion 4 acquires a steering angle of the steering as the movement direction of the moving body 110.

(Change of Irradiation Range and Irradiation Position of Light Based on Surrounding Status of Position where Moving Body is Moving)

The control portion 3 controls to change the angle range Ws at which the mirror portion 20 swings based on the surrounding status of the position where the moving body 110 is moving. Specifically, when the moving body 110 is moving on the highway, the control portion 3 controls the first optical scanner 2a so as to narrow the irradiation range R of the scanning light. In addition, when the moving body 110 is moving in the urban area, the control portion 3 controls the first optical scanner 2a so as to widen the irradiation range R of the scanning light.

In addition, the control portion 3 controls to change the irradiation position of the light based on the surrounding status of the position where the moving body 110 is moving. Specifically, when the road 50 (see FIG. 11) on which the moving body 110 is moving is curved, the control portion 3 controls the first optical scanner 2a and the second optical scanner 2b to change the irradiation position of the light in the direction in which the road 50 is curved.

Moreover, in the embodiment, the control portion 3 controls to change the irradiation range R of the light and controls to change the irradiation position together.

(Control of Irradiation Range and Irradiation Position by First Optical Scanner and Second Optical Scanner)

Figure 12:
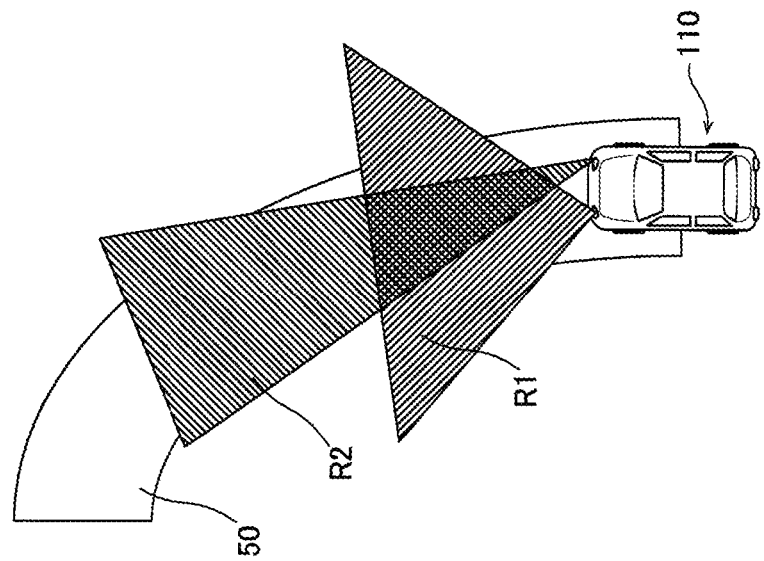
FIG. 12 is a schematic diagram for illustrating a configuration in which the control portion according to an embodiment controls a first optical scanner and a second optical scanner.
Figure 12:
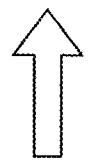
Figure 12:
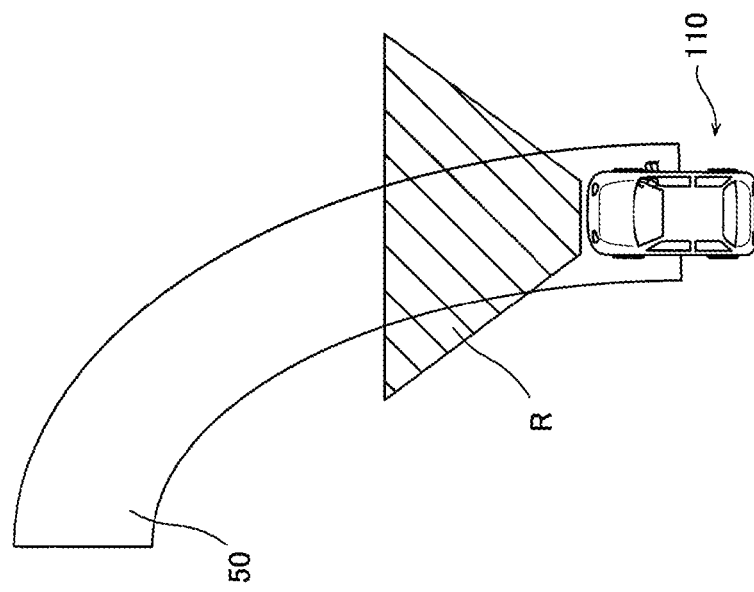

In the embodiment, as shown in FIG. 12, the control portion 3 controls to make the irradiation range R (the first irradiation range R1) of the scanning light of the first optical scanner 2a different from the irradiation range R (the second irradiation range R2) of the scanning light of the second optical scanner 2b, and to make the irradiation position of the scanning light of the first optical scanner 2a different from the irradiation position of the scanning light of the second optical scanner 2b.

In the example shown in FIG. 12, the control portion 3 controls the first optical scanner 2a to widen the first irradiation range R1 of the light irradiated from the first optical scanner 2a. In addition, the control portion 3 controls the second optical scanner 2b to narrow the second irradiation range R2 of the light irradiated from the second optical scanner 2b. Moreover, in the example shown in FIG. 12, the control portion 3 also controls to change the irradiation positions of the light irradiated from the first optical scanner 2a and the second optical scanner 2b to the left side.

(Change of Irradiation Range and Irradiation Position Based on Operation Input)

In the embodiment, the control portion 3 changes the irradiation range R of the light and the irradiation position of the light based on the operation input. Specifically, the control portion 3 acquires the operation input of the operator acquired by the input reception portion 5 as the change information 30 of the angle range Ws. The control portion 3 changes the irradiation range R of the light based on the acquired change information 30 of the angle range Ws.

In addition, the operation input of the operator includes information for changing the irradiation position of the light. Therefore, the control portion 3 changes the irradiation position of the light based on the operation input of the operator acquired by the input reception portion 5.

(Formation of Region Irradiated with Light and Region not Irradiated with Light)

Figure 13:
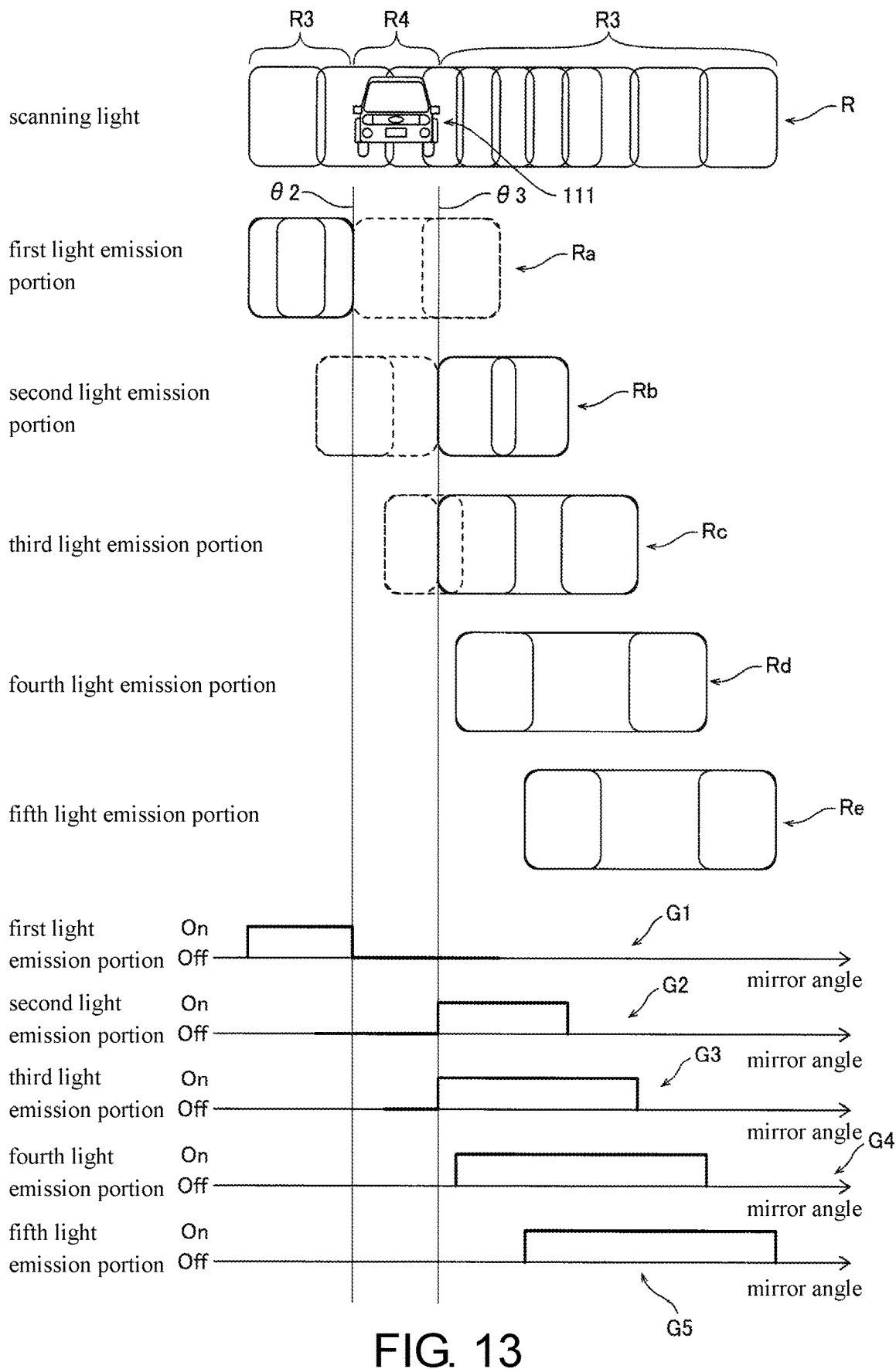
FIG. 13 is a schematic diagram for illustrating a configuration in which the control portion according to an embodiment forms a region irradiated with light and a region not irradiated with light.

Next, with reference to FIG. 13, the control of the control portion 3 to form the region R3 irradiated with light and the region R4 not irradiated with light is described.

The example shown in FIG. 13 shows a case where another moving body 111 (oncoming vehicle) is positioned in the irradiation range R. In the embodiment, the control portion 3 (see FIG. 2) controls to form the region R3 irradiated with light and the region R4 not irradiated with light by switching between a turning-on state and a turning-off state of the light source based on the movement status information 31 (see FIG. 2) acquired by the movement status information acquisition portion 4 (see FIG. 2) and the swing angle of the mirror portion 20 (see FIG. 2) acquired by the swing angle acquisition portion 7 (see FIG. 2).

Specifically, the control portion 3 controls to stop the light irradiation from the light emission portion 10 when the light irradiated from each light emission portion 10 (see FIG. 2) is irradiated at an angle at which the another moving body 111 is positioned. Specifically, when the angle of the mirror portion 20 while reflecting the light irradiated from the light emission portion 10 is an angle included in the range from an angle θ2 to an angle θ3, the light irradiation from the light emission portion 10 is stopped.

Moreover, in the example shown in FIG. 13, among the irradiation range Ra to the irradiation range Rc of the light irradiated from the first light emission portion 10a to the third light emission portion 10c, the range where light irradiation is stopped is indicated by a broken line.

In addition, graphs G1 to G5 shown in FIG. 13 are timing charts showing timings for switching between the light irradiation and the light irradiation stop based on the angle at which the mirror portion 20 reflects the light. In each of the graphs G1 to G5, a horizontal axis is the mirror angle.

In the example shown in FIG. 13, angles of the mirror portion 20 which reflects the light irradiated from the first light emission portion 10a, the second light emission portion 10b, and the third light emission portion 10c include angles within the range from the angle θ2 to the angle θ3. Therefore, as shown in graphs G1 to G3, if the angle of the mirror portion 20 when the light irradiated from each of the first light emission portion 10a to the third light emission portion 10c is reflected by the mirror portion 20 is included in the range from the angle θ2 to the angle θ3, the control portion 3 controls to stop the light irradiation from each light emission portion 10. Moreover, if the angle of the mirror portion 20 when the light irradiated from each of the first light emission portion 10a to the third light emission portion 10c is reflected by the mirror portion 20 is not included in the range from the angle θ2 to the angle θ3, the control portion 3 controls to irradiate the light from each of the first light emission portion 10a to the third light emission portion 10c.

In addition, as shown in graphs G4 and G5, the angles of the mirror portion 20 when the light irradiated from the fourth light emission portion 10d and the fifth light emission portion 10e is reflected by the mirror portion 20 are not included in the range from the angle θ2 to the angle θ3, and thus the control portion 3 does not control to stop the light irradiation from the fourth light emission portion 10d and the fifth light emission portion 10e.

(Processing of Changing Irradiation Range Based on Movement Speed of Moving Body)

Figure 14:
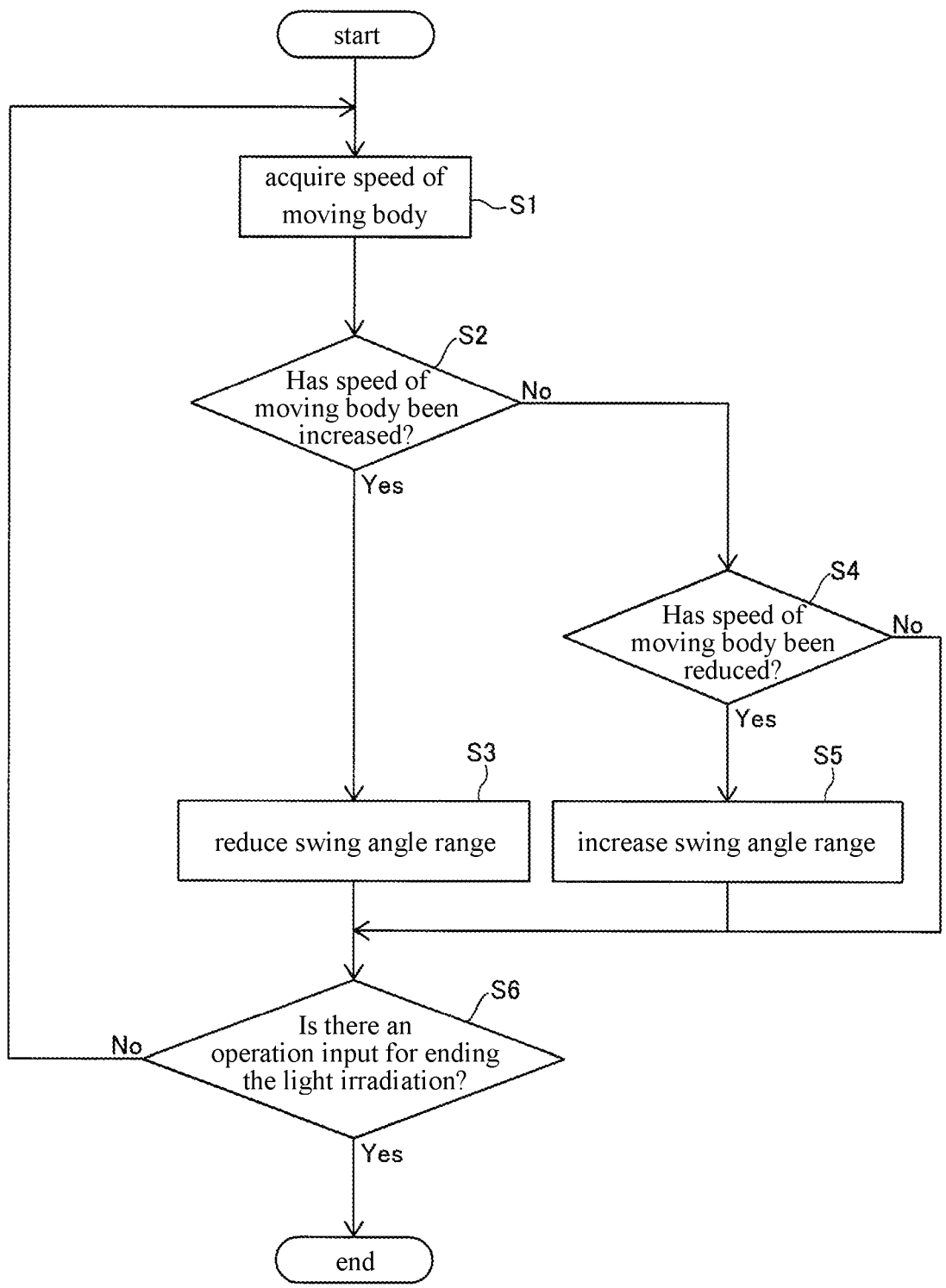
FIG. 14 is a flowchart for illustrating processing in which the control portion according to an embodiment changes the irradiation range of the light based on the movement speed of the moving body.

Next, with reference to FIG. 14, processing in which the control portion 3 changes the irradiation range R of the light based on the movement speed of the moving body 110 is described. Moreover, the processing in which the control portion 3 changes the irradiation range R of the light based on the movement speed of the moving body 110 is performed when the light is irradiated from the light source.

In step S1, the movement status information acquisition portion 4 acquires the movement speed of the moving body 110. The movement status information acquisition portion 4 outputs the acquired movement speed of the moving body 110 to the control portion 3.

In step S2, the control portion 3 determines whether the movement speed of the moving body 110 has been increased. If the movement speed of the moving body 110 has been increased, the processing proceeds to step S3. If the movement speed of the moving body 110 has not been increased, the processing proceeds to step S4.

In step S3, the control portion 3 controls to reduce the swing angle range Ws of the mirror portion 20. Specifically, the control portion 3 controls to reduce the swing angle range Ws of the mirror portion 20 by reducing a voltage applied to the drive source 21. Thereafter, the processing proceeds to step S6.

In addition, in step S4, the control portion 3 determines whether the movement speed of the moving body 110 has been reduced. If the movement speed of the moving body 110 has been reduced, the processing proceeds to step S5. If the movement speed of the moving body 110 has not been reduced, the processing proceeds to step S6. That is, the control portion 3 does not control to change the swing angle range Ws of the mirror portion 20 when the movement speed of the moving body 110 has not changed.

In step S5, the control portion 3 controls to increase the swing angle range Ws of the mirror portion 20. Specifically, the control portion 3 controls to increase the swing angle range Ws of the mirror portion 20 by increasing the voltage applied to the drive source 21. Thereafter, the processing proceeds to step S6.

In step S6, the control portion 3 determines whether there is an operation input for ending the light irradiation. If there is no operation input for ending the light irradiation, the processing proceeds to step S1. If there is an operation input for ending the light irradiation, the processing ends.

Moreover, either the processing of step S2 or the processing of step S4 may be performed first.

(Processing of Changing Irradiation Position Based on Movement Direction of Moving Body)

Figure 15:
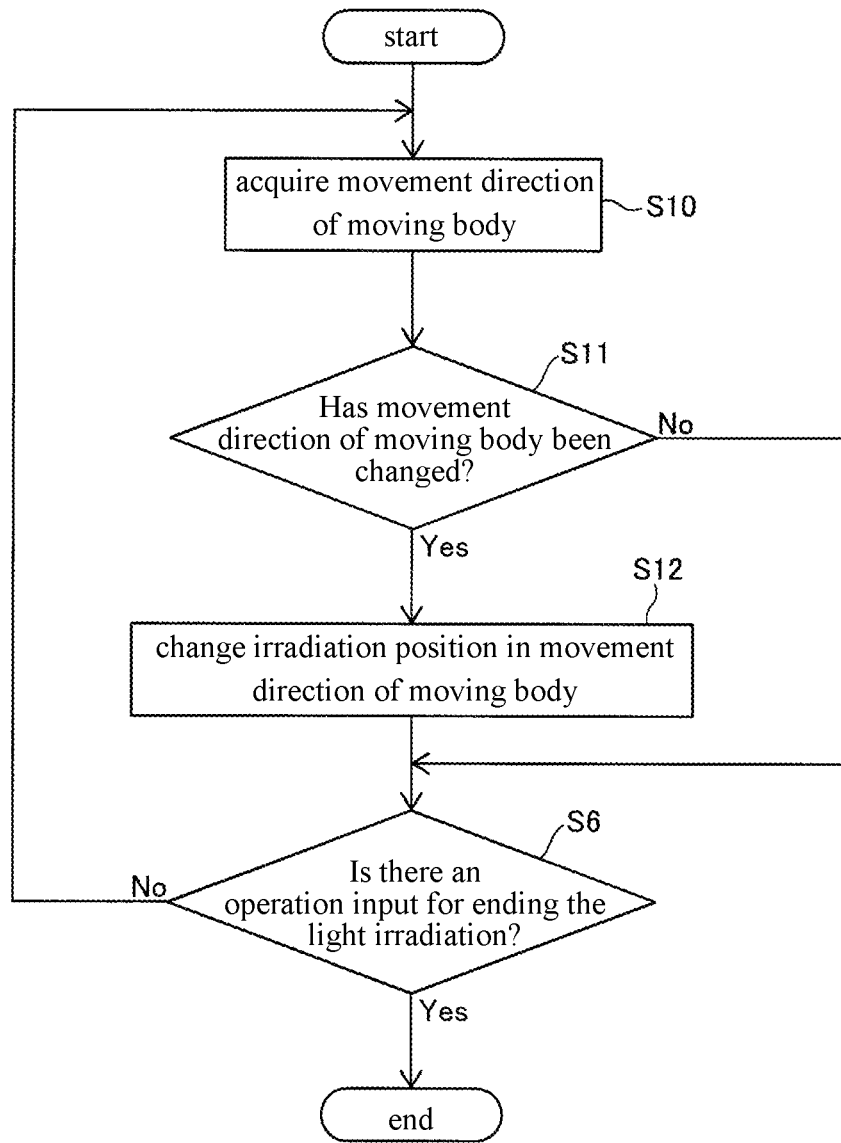
FIG. 15 is a flowchart for illustrating processing in which the control portion according to an embodiment changes the irradiation position of the light based on the movement direction of the moving body.

Next, with reference to FIG. 15, processing in which the control portion 3 changes the irradiation position of the light based on the movement direction of the moving body 110 is described. Moreover, steps for performing the same processing as that shown in FIG. 14 are designated by the same reference signs, and detailed description thereof is omitted. Moreover, the processing in which the control portion 3 changes the irradiation position of the light based on the movement direction of the moving body 110 is performed when the light is irradiated from the light source.

In step S10, the movement status information acquisition portion 4 acquires the movement direction of the moving body 110. The movement status information acquisition portion 4 outputs the acquired movement direction of the moving body 110 to the control portion 3.

In step S11, the control portion 3 determines whether the movement direction of the moving body 110 has been changed. If the movement direction of the moving body 110 has been changed, the processing proceeds to step S12. If the movement direction of the moving body 110 has not been changed, the processing proceeds to step S6.

In step S12, the control portion 3 changes the irradiation position of the light in the movement direction of the moving body 110. Thereafter, the processing proceeds to step S6.

In step S6, the control portion 3 determines whether there is an operation input for ending the light irradiation. If there is no operation input for ending the light irradiation, the processing proceeds to step S10. If there is an operation input for ending the light irradiation, the processing ends.

(Processing of Changing Irradiation Range and Irradiation Position of Light Based on Surrounding Status of Position of Moving Body)

Figure 16:
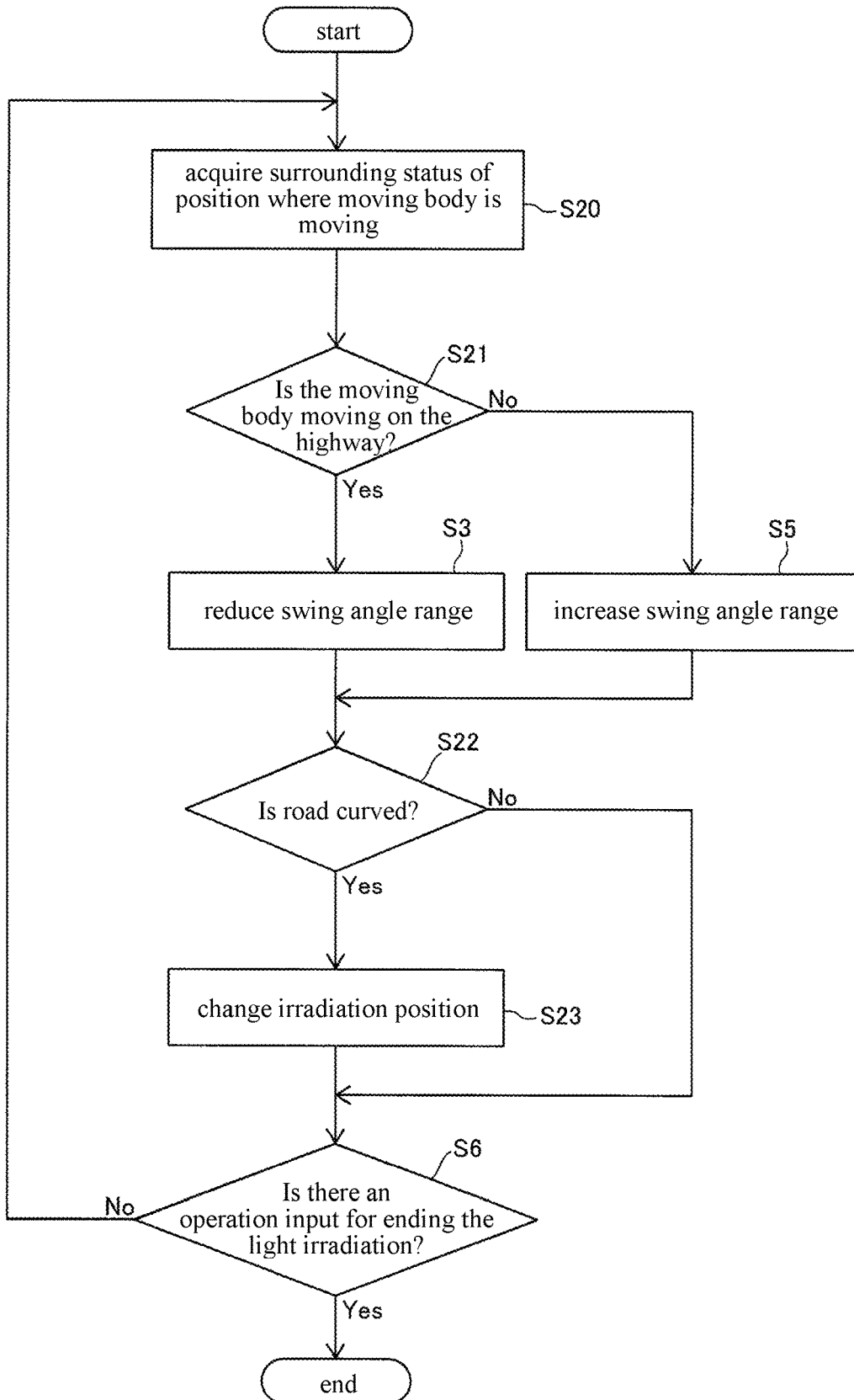
FIG. 16 is a flowchart for illustrating processing in which the control portion according to an embodiment changes the irradiation range and the irradiation position of the light based on a surrounding status of a position where the moving body is moving.

Next, with reference to FIG. 16, processing in which the control portion 3 changes the irradiation position of the light based on the movement direction of the moving body 110 is described. Moreover, steps for performing the same processing as that shown in FIGS. 14 and 15 are designated by the same reference signs, and detailed description thereof is omitted. In addition, the processing in which the control portion 3 changes the irradiation position of the light based on the movement direction of the moving body 110 is performed when the light is irradiated from the light source.

In step S20, the movement status information acquisition portion 4 acquires the surrounding status of the position where the moving body 110 is moving. The movement status information acquisition portion 4 outputs, to the control portion 3, the surrounding status of the position where the acquired moving body 110 is moving.

In step S21, the control portion 3 determines whether the moving body 110 is moving on the highway. If the moving body 110 is moving on the highway, the processing proceeds to step S3 and then to step S22. If the moving body 110 is not moving on the highway, the processing proceeds to step S5 and then to step S22.

In step S22, the control portion 3 determines whether the road 50 on which the moving body 110 is moving is curved. If the road 50 on which the moving body 110 is moving is curved, the processing proceeds to step S23. If the road 50 on which the moving body 110 is moving is not curved, the processing proceeds to step S6.

In step S23, the control portion 3 changes the irradiation position of the light according to the curve of the road 50 on which the moving body 110 is moving. Thereafter, the processing proceeds to step S6.

In step S6, the control portion 3 determines whether there is an operation input for ending the light irradiation. If there is no operation input for ending the light irradiation, the processing proceeds to step S10. If there is an operation input for ending the light irradiation, the processing ends.

Moreover, either of the control of the swing angle range Ws of the mirror portion 20 performed by the processing of step S21 and the processing of step S3 or S5, or the control of the irradiation position of the light performed by the processing of step S22 and the processing of step S23 may be performed first.

(Processing of Changing Irradiation Range and Irradiation Position of Light Based on Operation Input)

Figure 17:
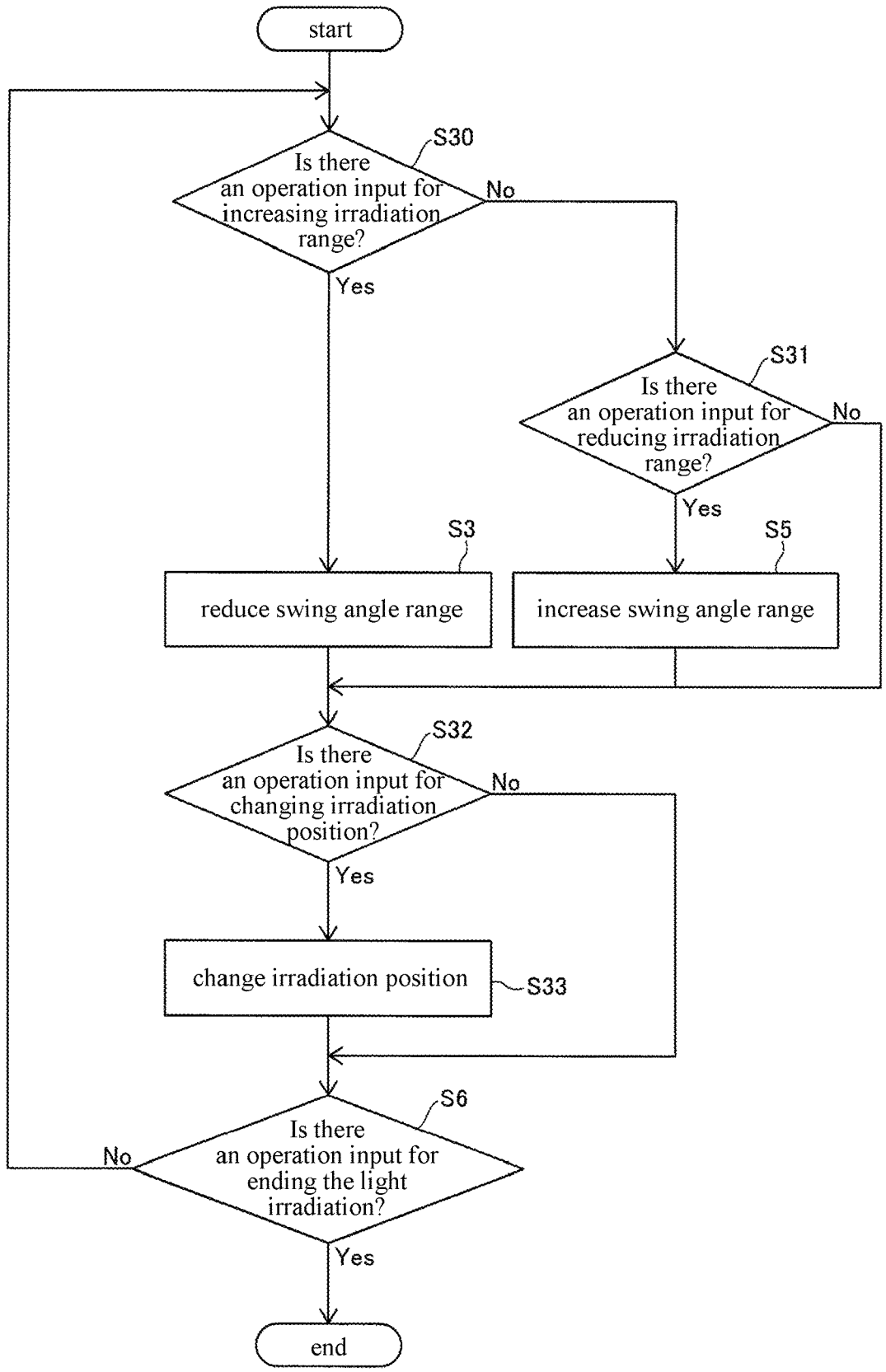
FIG. 17 is a flowchart for illustrating processing in which the control portion according to an embodiment changes the irradiation range and the irradiation position of the light based on an operation input.

Next, with reference to FIG. 17, processing in which the control portion 3 changes the irradiation range R and the irradiation position of the light based on the operation input of the operator is described. Steps for performing the same processing as that shown in FIGS. 14 and 15 are designated by the same reference signs, and detailed description thereof will be omitted. In addition, the processing in which the control portion 3 changes the irradiation range R and the irradiation position of the light based on the operation input of the operator is performed when the light is irradiated from the light source.

In step S30, the control portion 3 determines whether there is an operation input for increasing the irradiation range R of the light. If there is an operation input for increasing the irradiation range R of the light, the processing proceeds to step S3 and then to step S32. If there is no operation input for increasing the irradiation range R of the light, the processing proceeds to step S31.

In step S31, the control portion 3 determines whether there is an operation input for reducing the irradiation range R of the light. If there is an operation input for reducing the irradiation range R of the light, the processing proceeds to step S5 and then to step S32. If there is no operation input for reducing the irradiation range R of the light, the processing proceeds to step S32. That is, the control portion 3 does not control to change the irradiation range R of the light if there is no operation input for changing the irradiation range R of the light.

In step S32, the control portion 3 determines whether there is an operation input for changing the irradiation position of the light. If there is an operation input for changing the irradiation position of the light, the processing proceeds to step S33. If there is no operation input for changing the irradiation position of the light, the processing proceeds to step S6.

In step S33, the control portion 3 controls to change the irradiation position of the light. In the processing of step S33, the control portion 3 controls to change the irradiation position of the light in a manner that the light is irradiated to a position input by the operator. Thereafter, the processing proceeds to step S6.

In step S6, the control portion 3 determines whether there is an operation input for ending the light irradiation. If there is no operation input for ending the light irradiation, the processing proceeds to step S20. If there is an operation input for ending the light irradiation, the processing ends.

Moreover, either of the control of the swing angle range Ws of the mirror portion 20 performed by the processing of step S30, the processing of step S31, and the processing of step S3 or S5, or the control of the irradiation position of the light performed by the processing of step S32 and the processing of step S33 may be performed first.

Effects of the Embodiment

In the embodiment, the following effects can be obtained.

In the embodiment, as described above, the light projection device for moving body 100 is arranged on the moving body 110 and includes: the light source for irradiating the light; the optical scanner which has the mirror portion 20 for reflecting the light irradiated from the light source and the drive source 21 for swinging the mirror portion 20, and scans the light irradiated from the light source; and the control portion 3 which controls to acquire the change information 30 of the angle range Ws at which the mirror portion 20 swings, change the angle range Ws at which the mirror portion 20 swings by controlling the drive source 21 based on the acquired change information 30, and change the irradiation range R of the light irradiated from the light source. Thereby, the scanning range of the light irradiated from the light source can be increased by increasing the swing angle range Ws of the mirror portion 20, and thus the irradiation range R of the light irradiated from the light source can be widened. In addition, the scanning range of the light irradiated from the light source can be reduced by reducing the swing angle range Ws of the mirror portion 20, and thus the irradiation range R of the light irradiated from the light source can be narrowed. As a result, the irradiation range R of the irradiated light can be widened or narrowed.

In addition, in the embodiment, as described above, the light projection device for moving body 100 further includes the movement status information acquisition portion 4 which acquires the movement status information 31. The control portion 3 acquires the change information 30 of the angle range Ws during the movement of the moving body 110 based on the movement status information 31 acquired by the movement status information acquisition portion 4. Thereby, the angle range Ws at which the mirror portion 20 swings is changed according to the movement status of the moving body 110, and thus the irradiation range R can be changed easily to an irradiation range R corresponding to the movement status of the moving body 110.

In addition, in the embodiment, as described above, the movement status information acquisition portion 4 acquires, as the movement status information 31, at least one of the movement speed of the moving body 110, the movement direction of the moving body 110, and the surrounding status of the position where the moving body 110 is moving; and the control portion 3 acquires the change information 30 of the angle range Ws based on at least one of the movement speed of the moving body 110, the movement direction of the moving body 110, and the surrounding status of the position where the moving body 110 is moving. Thereby, the irradiation range R of the light can be changed according to the movement speed of the moving body 110, the movement direction of the moving body 110, the surrounding status of the position where the moving body 110 is moving, and the like. As a result, the irradiation range can be changed to the irradiation range R suitable for the movement status of the moving body 110, and thus usability (user convenience) can be improved.

In addition, in the embodiment, as described above, the mirror portion 20 is made of a metal member having a flat plate shape; the drive source 21 generates the plate wave and swings the mirror portion 20 by the generated plate wave in a manner that the mirror portion 20 reciprocates and vibrates around the axis line of the predetermined swing axis Ax; and the control portion 3 controls to change the swing angle of the mirror portion 20 by changing the voltage applied to the drive source 21. Thereby, the mirror portion 20 is swung by the plate wave, and thus the size of the mirror portion can be increased compared with, for example, the MEMS mirror. As a result, because the size of the mirror portion 20 can be increased, the irradiation range R of the scanning light can be easily widened in an optical path after being reflected by the mirror portion 20 without arranging a projection lens.

In addition, in the embodiment, as described above, the light projection device for moving body 100 further includes the input reception portion 5 which receives the operation input of the operator as the change information 30 of the angle range Ws. The control portion 3 controls to change the irradiation range R of the scanning light of the optical scanner according to the operation input of the operator. Thereby, the operator performs an input operation, and thereby the light can be irradiated to the region corresponding to the operation input, for example, even in a state that the moving body 110 stops. As a result, because the light can be irradiated to the desired range, for example, the light projection device for moving body 100 can be used as a substitute for an illumination device in the event of a disaster or the like.

In addition, in the embodiment, as described above, the light projection device for moving body 100 further includes the scanning center change mechanism which changes the center of the scanning range of the scanning light scanned by the mirror portion 20. The control portion 3 changes the swing center Sc of the mirror portion 20 by controlling the scanning center change mechanism based on the change information 30 (the movement status information 31) of the angle range Ws, and controls the irradiation position of the light irradiated from the light source. Thereby, not only the irradiation region of the light, but also the irradiation position of the light can be changed, and thus the irradiation range R of the scanning light can be changed to a range more suitable for the movement status of the moving body 110. As a result, the usability can be further improved.

In addition, in the embodiment, as described above, the scanning center change mechanism includes the swing center change mechanism 6 which changes the swing center Sc when the mirror portion 20 swings; and the control portion 3 controls the irradiation position of the light irradiated from the light source by controlling to change the swing center Sc of the mirror portion 20 based on the change information (the movement status information 31) of the angle range Ws. Thereby, the swing center Sc of the mirror portion 20 can be easily changed by the swing center change mechanism 6. As a result, the irradiation position of the scanning light can be easily changed.

In addition, in the embodiment, as described above, the light source has the plurality of light emission portions 10; and the optical scanner scans the light irradiated from the plurality of light emission portions 10. Thereby, the light amount of the irradiated light can be increased compared with a configuration in which the light source has one light emission portion 10. As a result, when the irradiation range R is reduced, the light can be made to reach farther compared with the configuration having one light emission portion 10. In addition, when the irradiation range R is increased, the light amount of the light irradiated within the irradiation range R can be increased compared with the configuration having one light emission portion 10, and thus the irradiation range R can be illuminated more brightly.

In addition, in the embodiment, as described above, the light source includes the first light source 1a and the second light source 1b; the optical scanner includes the first optical scanner 2a that scans the light irradiated from the first light source 1a, and the second optical scanner 2b that scans the light irradiated from the second light source 1b; and the control portion 3 controls the irradiation range R of the scanning light of the first optical scanner 2a to be different from the irradiation range R of the scanning light of the second optical scanner 2b, and controls the irradiation position of the scanning light of the first optical scanner 2a to be different from the irradiation position of the scanning light of the second optical scanner 2b. Thereby, for example, the light is irradiated to a wide range by the first optical scanner 2a, and the light is irradiated farther in a narrow irradiation width by the second optical scanner 2b, and thereby the light can be irradiated to the region and the position more suitable for the movement status of the moving body 110. As a result, the usability can be even more improved.

In addition, in the embodiment, as described above, the light projection device for moving body 100 further includes the swing angle acquisition portion 7 which acquires the swing angle of the mirror portion 20. The control portion 3 controls to form the region not irradiated with light and the region irradiated with light by switching between the turning-on state and the turning-off state of the light source based on the movement status information 31 acquired by the movement status information acquisition portion 4 and the swing angle of the mirror portion 20 acquired by the swing angle acquisition portion 7. Thereby, in the configuration in which the irradiation range R and the irradiation position of the light can be changed, the region irradiated with light and the region not irradiated with light can be formed, and thus the irradiated light can be scanned in the desired region. As a result, for example, when another moving body 111 moving in a direction facing the moving body 110 or the like is positioned in the region irradiated with light, the light can be suppressed from being irradiated to this another moving body 111.

In addition, in the embodiment, as described above, the light projection device for moving body 100 further includes the first lens 8 to which the light is irradiated from the light source; and the second lens 9 which is arranged between the first lens 8 and the optical scanner, and condenses the light passing through the first lens 8 to the optical scanner. Thereby, the irradiation range R of the light irradiated from the light source can be adjusted by the first lens 8 and the second lens 9, and thus of the light irradiated from the light source, the light irradiated to a position other than the mirror portion 20 can be reduced. As a result, utilization efficiency of the light irradiated from the light source can be improved.

Variation Example

Moreover, it should be considered that the embodiment disclosed this time is exemplary in all respects and is not restrictive. The scope of the disclosure is indicated by claims instead of the description of the aforementioned embodiment, and meanings equivalent to the claims and all changes (variation examples) within the scope of the claims are intended to be included.

Figure 18:
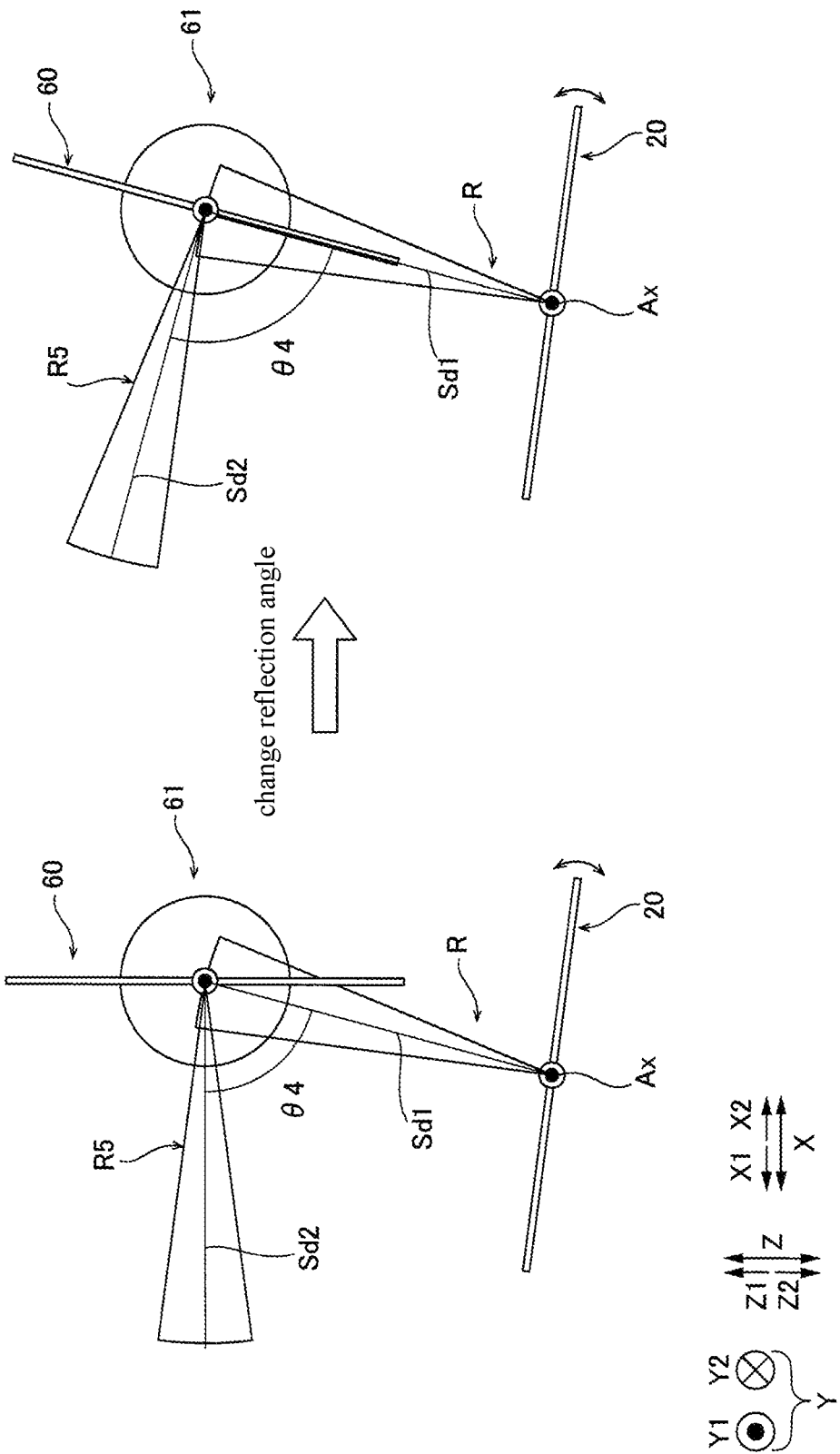
FIG. 18 is a schematic diagram for illustrating a configuration for changing the irradiation position of the light by a scanning center change mechanism according to a first variation example.

For example, in the above embodiment, the configuration example is shown in which the scanning center change mechanism includes the swing center change mechanism 6, but the disclosure is not limited hereto. For example, as in a first variation example shown in FIG. 18, the scanning center change mechanism may include a reflection member 60 and a pivoting portion 61 instead of the swing center change mechanism 6.

The reflection member 60 is configured to reflect the scanning light scanned by the mirror portion 20. The reflection member 60 is made of a metal member having a plate shape.

The pivoting portion 61 is configured to pivot the reflection member 60. The pivoting portion 61 includes, for example, a motor and the like.

In the first variation example, the control portion 3 (see FIG. 2) controls to change a reflection angle θ4 of the scanning light reflected by the reflection member 60 based on the change information 30 (see FIG. 2) of the angle range Ws, thereby controlling the irradiation position of the light irradiated from the light source. Moreover, in the example shown in FIG. 18, the reflection angle θ4 is an angle between a center Sd1 of the irradiation range R of the light swung by the mirror portion 20 and a center Sd2 of an irradiation range R5 of the light after being reflected by the reflection member 60.

In the first variation example, as described above, the scanning center change mechanism includes the reflection member 60 that reflects the scanning light scanned by the mirror portion 20 and the pivoting portion 61 that pivots the reflection member 60. The control portion. 3 controls to change the reflection angle θ4 of the scanning light reflected by the reflection member 60 based on the change information 30 (see FIG. 2) of the angle range Ws, thereby controlling the irradiation position of the light irradiated from the light source. Thereby, the irradiation position of the scanning light can be easily changed by changing the reflection angle θ4 of the reflection member 60.

Figure 19:
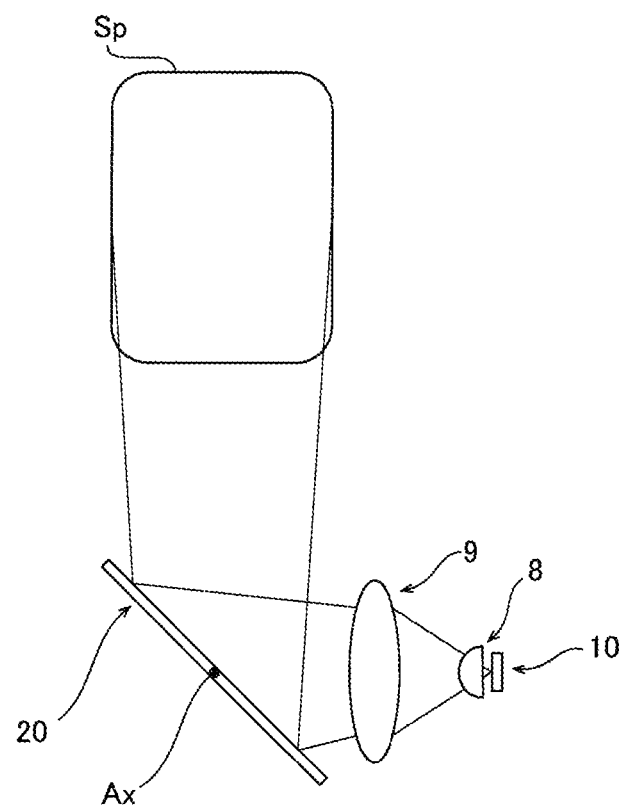
FIG. 19 is a schematic diagram for illustrating spot light irradiated from one light emission portion when a mirror portion of an optical scanner according to a second variation example is stopped.

In addition, in the above embodiment, the configuration example is shown in which the first light source 1a and the second light source 1b have the plurality of light emission portions 10, but the disclosure is not limited hereto. For example, as in a second variation example shown in FIG. 19, the first light source 1a and the second light source 1b may be configured to include only one light emission portion 10. Light irradiated from the one light emission portion 10 is reflected by the mirror portion 20 and irradiated as spot light Sp. Moreover, because the first light source 1a and the second light source 1b have the same configuration, only the first light source 1a is shown in FIG. 19.

Figure 20:
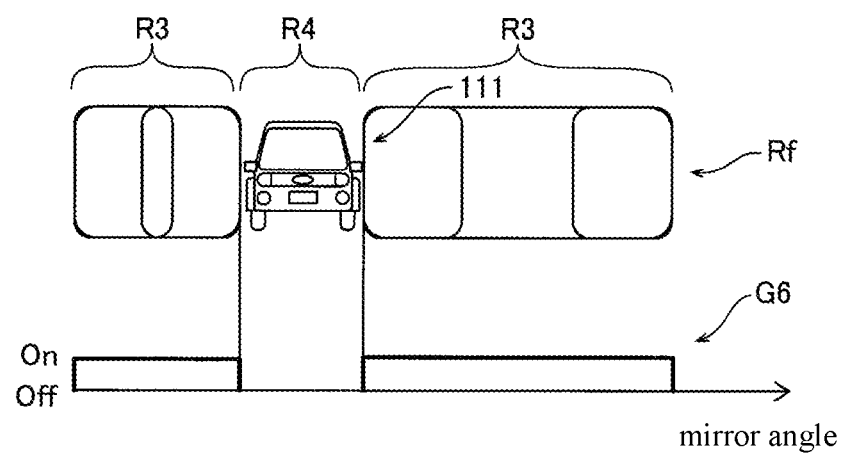
FIG. 20 is a schematic diagram for illustrating a configuration in which a control portion according to the second variation example forms a region irradiated with light and a region not irradiated with light.

In addition, as shown in FIG. 20, in the case of the configuration in which the first light source 1a has one light emission portion 10, the spot light Sp is scanned by the mirror portion 20 to illuminate an irradiation range Rf as scanning light.

In addition, in the case of the configuration in which the first light source 1a has only one light emission portion 10, the control portion 3 may control the light emission portion 10 to form the region R3 irradiated with light and the region R4 not irradiated with light. Specifically, as shown in FIG. 20, the control portion 3 may stop the light irradiation from the light emission portion 10 when the irradiation angle of the light irradiated from the light emission portion 10 is included in the range from the angle θ2 to the angle θ3.

In addition, as shown in a graph G6, if the angle of the mirror portion 20 when the light irradiated from the light emission portion 10 is reflected by the mirror portion 20 is included in the range from the angle θ2 to the angle θ3, the control portion 3 controls to stop the light irradiation from the light emission portion 10. Moreover, if the angle of the mirror portion 20 when the light irradiated from the light emission portion 10 is reflected by the mirror portion 20 is not included in the range from the angle θ2 to the angle θ3, the control portion 3 controls to irradiate the light from the light emission portion 10. The graph G6 is a timing chart showing the timing of switching between the light irradiation and the light irradiation stop based on the angle at which the mirror portion 20 reflects the light. In the graph G6, a horizontal axis is the mirror angle.

In addition, in the above embodiment, the configuration example is shown in which the control portion 3 changes the irradiation range R and the irradiation position by using, as the movement status information 31 of the moving body 110, all of the movement speed of the moving body 110, the movement direction of the moving body 110, and the surrounding status of the position where the moving body 110 is moving, but the disclosure is not limited hereto. For example, the control portion 3 may change the irradiation range R and the irradiation position by using, as the movement status information 31 of the moving body 110, any one of the movement speed of the moving body 110, the movement direction of the moving body 110, and the surrounding status of the position where the moving body 110 is moving. In addition, the control portion 3 may change the irradiation range R and the irradiation position by using, as the movement status information 31 of the moving body 110, any two of the movement speed of the moving body 110, the movement direction of the moving body 110, and the surrounding status of the position where the moving body 110 is moving.

In addition, in the above embodiment, the configuration example is shown in which the control portion 3 changes the irradiation range R and the irradiation position, but the disclosure is not limited hereto. For example, the control portion 3 may change either the irradiation range R or the irradiation position.

In addition, in the above embodiment, the example is shown in which the mirror portion 20 is made of a metal member, but the disclosure is not limited hereto. For example, the mirror portion 20 may be a MEMS mirror. The mirror portion 20 may be configured in any way as long as the mirror portion 20 is a resonance drive type mirror.

In addition, in the above embodiment, the configuration example is shown in which the light projection device for moving body 100 includes the first optical scanner 2a and the second optical scanner 2b as the optical scanner, but the disclosure is not limited hereto. For example, the light projection device for moving body 100 may include either the first optical scanner 2a or the second optical scanner 2b as the optical scanner. When the light projection device for moving body 100 includes either the first optical scanner 2a or the second light scanner 2b, the moving body 110 may be equipped with two light projection devices for moving body 100.

In addition, in the above embodiment, the configuration example is shown in which the movement status information acquisition portion 4 acquires the map information by the car navigation system as the surrounding status of the position where the moving body 110 is moving, but the disclosure is not limited hereto. For example, the movement status information acquisition portion 4 may acquire information on whether the moving body 110 is traveling on a toll road from electronic toll collection system (ETC) (registered trademark) as the surrounding status of the position where the moving body 110 is moving. In the case where the movement status information acquisition portion 4 acquires the information on whether the moving body 110 is traveling on the toll road from the ETC, the control portion 3 may control to narrow the irradiation range R when the moving body 110 is traveling on the toll road, and may control to widen the irradiation range R when the moving body 110 is not traveling on the toll road.

In addition, in the above embodiment, the configuration example is shown in which the light projection device for moving body 100 is mounted on an automobile to form the moving body 110, but the disclosure is not limited hereto. For example, the light projection device for moving body 100 may be mounted on a moving body other than an automobile to form a moving body. For example, the light projection device for moving body 100 may be mounted on a motorcycle or the like to form the moving body.

In addition, in the above embodiment, the configuration example is shown in which the control portion 3 forms the region R3 irradiated with light and the region R4 not irradiated with light, but the disclosure is not limited hereto. The control portion 3 may not form the region R3 irradiated with light and the region R4 not irradiated with light.

In addition, in the above embodiment, the configuration example is shown in which the movement status information acquisition portion 4 acquires the steering angle of the steering as the movement direction of the moving body 110, but the disclosure is not limited hereto. For example, the movement status information acquisition portion 4 may acquire, as the movement direction of the moving body 110, information on a posture of the moving body 110 from a global positioning system (GPS) or the like.

In addition, in the above embodiment, the configuration example is shown in which each of the first light source 1a and the second light source 1b has five light emission portions 10 as the plurality of light emission portions 10, but the disclosure is not limited hereto. For example, each of the first light source 1a and the second light source 1b may have, as the plurality of light emission portions 10, more than five light emission portions 10 or less than five light emission portions 10. With respect to the number of the plurality of light emission portions 10, an appropriate number may be selected according to the size of the irradiation range R to which the scanning light is irradiated and the swing angle of the mirror portion 20.

In addition, in the above embodiment, the configuration example is shown in which the substrate 22 has a U-shape, but the disclosure is not limited hereto. For example, the substrate 22 may have a V-shape or a Y-shape. The shape of the substrate 22 may be any shape as long as one side (A1-direction side) of the pair of beam portions 22a is supported by the support portion 22b.

In addition, in the above embodiment, the configuration example is shown in which the light projection device for moving body 100 includes the movement status information acquisition portion 4 and the swing angle acquisition portion 7, but the disclosure is not limited hereto. For example, the light projection device for moving body 100 may not include the movement status information acquisition portion 4 and the swing angle acquisition portion 7.

Other Configurations

The light projection device for moving body according to one aspect of the disclosure is arranged on a moving body and includes: a light source for irradiating light; an optical scanner which has a mirror portion for reflecting the light irradiated from the light source and a drive source for swinging the mirror portion, and scans the light irradiated from the light source; and a control portion which controls to acquire change information of an angle range at which the mirror portion swings, change the angle range at which the mirror portion swings by controlling the drive source based on the acquired change information, and change an irradiation range of the light irradiated from the light source.

The light projection device for moving body according to one aspect of the disclosure includes, as described above, the control portion which controls to acquire the change information of the angle range at which the mirror portion swings, change the angle range at which the mirror portion swings by controlling the drive source based on the acquired change information, and change the irradiation range of the light irradiated from the light source. Thereby, the scanning range of the light irradiated from the light source can be increased by increasing the swing angle range of the mirror portion, and thus the irradiation range of the light irradiated from the light source can be widened. In addition, the scanning range of the light irradiated from the light source can be reduced by reducing the swing angle range of the mirror portion, and thus the irradiation range of the light irradiated from the light source can be narrowed. As a result, the irradiation range of the irradiated light can be widened or narrowed.

In the light projection device for moving body according to the above one aspect, preferably, a movement status information acquisition portion is further included which acquires movement status information, and the control portion acquires the change information of the angle range during the movement of the moving body based on the movement status information acquired by the movement status information acquisition portion. With this configuration, the angle range at which the mirror portion swings is changed according to the movement status of the moving body, and thus the irradiation range can be changed easily to an irradiation range corresponding to the movement status of the moving body.

In the configuration in which the change information of the angle range during the movement of the moving body is acquired based on the movement status information acquired by the above movement status information acquisition portion, preferably, the movement status information acquisition portion acquires, as the movement status information, at least one of a movement speed of the moving body, a movement direction of the moving body, and a surrounding status of a position where the moving body is moving; and the control portion acquires the change information of the angle range based on at least one of the movement speed of the moving body, the movement direction of the moving body, and the surrounding status of the position where the moving body is moving. With this configuration, the irradiation range of the light can be changed according to the movement speed of the moving body, the movement direction of the moving body, and the surrounding status of the position where the moving body is moving. As a result, the irradiation range can be changed to an irradiation range suitable for the movement status of the moving body, and thus usability (user convenience) can be improved.

In the light projection device for moving body according to the above one aspect, preferably, the mirror portion is made of a metal member having a flat plate shape; the drive source generates a plate wave and swings the mirror portion by the generated plate wave in a manner that the mirror portion reciprocates and vibrates around an axis line of a predetermined swing axis; and the control portion controls to change a swing angle of the mirror portion by changing a voltage applied to the drive source. With this configuration, the mirror portion is swung by the plate wave, and thus the size of the mirror portion can be increased compared with, for example, a micro electro mechanical systems (MEMS) mirror. As a result, because the size of the mirror portion can be increased, the irradiation range of the scanning light can be easily widened in an optical path after being reflected by the mirror portion without arranging a projection lens.

In the light projection device for moving body according to the above one aspect, preferably, an input reception portion is further included which receives an operation input of an operator as the change information of the angle range, and the control portion controls to change an irradiation range of the scanning light of the optical scanner according to the operation input of the operator. With this configuration, the operator performs an input operation, and thereby the light can be irradiated to the region corresponding to the operation input, for example, even in a state that the moving body stops. As a result, because the light can be irradiated to the desired range, for example, the light projection device for moving body can be used as a substitute for an illumination device in the event of a disaster or the like.

In the light projection device for moving body according to the above one aspect, preferably, a scanning center change mechanism is further included which changes a center of a scanning range of the scanning light scanned by the mirror portion; and the control portion changes a swing center of the mirror portion by controlling the scanning center change mechanism based on the change information of the angle range, and controls an irradiation position of the light irradiated from the light source. With this configuration, not only the irradiation region of the light, but also the irradiation position of the light can be changed, and thus the irradiation range of the scanning light can be changed to a range more suitable for the movement status of the moving body. As a result, the usability can be further improved.

In this case, preferably, the scanning center change mechanism includes a reflection member which reflects the scanning light scanned by the mirror portion, and a pivoting portion which pivots the reflection member; and the control portion controls the irradiation position of the light irradiated from the light source by controlling to change a reflection angle of the scanning light reflected by the reflection member based on the change information of the angle range. With this configuration, the irradiation position of the scanning light can be easily changed by changing the reflection angle of the reflection member.

In the configuration in which the swing center of the mirror portion is changed by controlling the scanning center change mechanism according to the movement status information and the irradiation position of the light irradiated from the light source is controlled, preferably, the scanning center change mechanism includes a swing center change mechanism which changes the swing center when the mirror portion swings; and the control portion controls the irradiation position of the light irradiated from the light source by controlling to change the swing center of the mirror portion based on the change information of the angle range. With this configuration, the swing center of the mirror portion can be easily changed by the swing center change mechanism. As a result, the irradiation position of the scanning light can be easily changed.

In the light projection device for moving body according to the above one aspect, preferably, the light source has a plurality of light emission portions; and the optical scanner scans light irradiated from the plurality of light emission portions. With this configuration, the light amount of the irradiated light can be increased compared with a configuration in which the light source has one light emission portion. As a result, when the irradiation range is reduced, the light can be made to reach farther compared with the configuration having one light emission portion. In addition, when the irradiation range is increased, the light amount of the light irradiated within the irradiation range can be increased compared with the configuration having one light emission portion, and thus the irradiation range can be illuminated more brightly.

In the light projection device for moving body according to the above one aspect, preferably, the light source includes a first light source and a second light source; the optical scanner includes a first optical scanner that scans light irradiated from the first light source, and a second optical scanner that scans light irradiated from the second light source; and the control portion controls an irradiation range of the scanning light of the first optical scanner to be different from an irradiation range of the scanning light of the second optical scanner, and controls an irradiation position of the scanning light of the first optical scanner to be different from an irradiation position of the scanning light of the second optical scanner. With this configuration, for example, the light is irradiated to a wide range by the first optical scanner, and the light is irradiated farther in a narrow irradiation width by the second optical scanner, and thereby the light can be irradiated to the region and the position more suitable for the movement status of the moving body. As a result, the usability can be even more improved.

In the configuration in which the angle range at which the mirror portion swings during the movement of the moving body is changed based on the movement status information acquired by the above movement status information acquisition portion, preferably, a swing angle acquisition portion is further included which acquires the swing angle of the mirror portion, and the control portion controls to form a region not irradiated with light and a region irradiated with light by switching between a turning-on state and a turning-off state of the light source based on the movement status information acquired by the movement status information acquisition portion and the swing angle of the mirror portion acquired by the swing angle acquisition portion. With this configuration, in the configuration in which the irradiation range and the irradiation position of the light can be changed, the region irradiated with light and the region not irradiated with light can be formed, and thus the irradiated light can be scanned in the desired region. As a result, for example, when another moving body or the like moving in a direction facing the moving body is positioned in the region irradiated with light, the light can be suppressed from being irradiated to this another moving body.

The light projection device for moving body according to the above one aspect preferably further includes a first lens to which the light is irradiated from the light source; and a second lens which is arranged between the first lens and the optical scanner, and condenses the light passing through the first lens to the optical scanner. With this configuration, the irradiation range of the light irradiated from the light source can be adjusted by the first lens and the second lens, and thus of the light irradiated from the light source, the light irradiated to a position other than the mirror portion can be reduced. As a result, utilization efficiency of the light irradiated from the light source can be improved.

According to the disclosure, as described above, the light projection device for moving body can be provided which is capable of widening or narrowing the irradiation range of the irradiated light even when the light irradiated from the light source is scanned by the mirror portion.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light projection method for a moving body which is performed by a processor of the moving body, comprising:
    irradiating light from a light source of the moving body;
    scanning the light irradiated from the light source with an angle range that is formed by swing a mirror portion of an optical scanner of the moving body;
    acquiring change information of the angle range at which the mirror portion swings;
    changing the angle range at which the mirror portion swings based on the acquired change information; and
    changing an irradiation range of the light irradiated from the light source.

2. The light projection method according to claim 1, further comprising:
    acquiring movement status information of the moving body; and
    acquiring the change information of the angle range during movement of the moving body based on the movement status information.

3. The light projection method according to claim 2, further comprising:
    acquiring the change information of the angle range based on at least one of a movement speed of the moving body, a movement direction of the moving body, and a surrounding status of the position where the moving body is moving that are acquired as the movement status information.

4. The light projection method according to claim 3, further comprising
    reducing the angle range when the movement speed of the moving body is increased, and increasing the angle range when the movement speed of the moving body is reduced.

5. The light projection method according to claim 1, further comprising:
    changing a swing center of the mirror portion based on the change information of the angle range, and controlling an irradiation position of the light irradiated from the light source.

6. The light projection method according to claim 5, further comprising:
    changing the swing center of the mirror portion based on the change information of the angle range to control the irradiation position of the light irradiated from the light source.

7. The light projection method according to claim 1, further comprising:
    acquiring a swing angle of the mirror portion;
    forming a region not irradiated with light and a region irradiated with light by switching between a turning-on state and a turning-off state of the light source based on the movement status information and the swing angle of the mirror portion.

8. The light projection method according to claim 1, further comprising:
    determining whether a road on which the moving body moves is curved; and
    changing an irradiation position of the light irradiated from the light source according to a curve of the road.

9. The light projection method according to claim 1, further comprising:
    receiving an operation input of an operator as the change information of the angle range; and
    changing the irradiation range according to the operation input of the operator.

10. The light projection method according to claim 9, further comprising:
    reducing the angle range when the operation input is to increase the irradiation range, and increasing the angle range when the operation input is to reduce the irradiation range.

* * * * *